United States Patent
Fujii et al.

(10) Patent No.: US 10,528,206 B1
(45) Date of Patent: Jan. 7, 2020

(54) MULTIFUNCTION TOUCH PANEL

(71) Applicant: NISSHA CO., LTD., Kyoto (JP)

(72) Inventors: Yoshiro Fujii, Kyoto (JP); Ryomei Omote, Kyoto (JP); Koji Okamoto, Osaka (JP); Toshihide Yamamoto, Kyoto (JP); Yohei Matsuyama, Hyogo (JP)

(73) Assignee: NISSHA CO., LTD., Kyoto (JP)

( * ) Notice: Subject to any disclaimer, the term of this patent is extended or adjusted under 35 U.S.C. 154(b) by 260 days.

(21) Appl. No.: 15/539,349

(22) PCT Filed: Jun. 1, 2016

(86) PCT No.: PCT/JP2016/066300
§ 371 (c)(1),
(2) Date: Sep. 18, 2017

(87) PCT Pub. No.: WO2016/208347
PCT Pub. Date: Dec. 29, 2016

(30) Foreign Application Priority Data

Jun. 24, 2015 (JP) ................................ 2015-126813

(51) Int. Cl.
*G06F 3/044* (2006.01)
*G06F 3/041* (2006.01)

(52) U.S. Cl.
CPC .......... *G06F 3/0445* (2019.05); *G06F 3/0414* (2013.01)

(58) Field of Classification Search
CPC ............................. G06F 3/0445; G06F 3/0414
See application file for complete search history.

(56) References Cited

U.S. PATENT DOCUMENTS

| | | |
|---|---|---|
| 2010/0245308 A1 | 9/2010 | Takei |
| 2012/0139864 A1* | 6/2012 | Sleeman ................. G06F 3/044 345/174 |

(Continued)

FOREIGN PATENT DOCUMENTS

| | | |
|---|---|---|
| JP | 7-334308 | 12/1995 |
| JP | 2010-231700 | 10/2010 |
| JP | 2015-106417 | 6/2015 |

OTHER PUBLICATIONS

International Search Report dated Jul. 5, 2016 in International (PCT) Application No. PCT/JP2016/066300.

*Primary Examiner* — Abbas I Abdulselam
(74) *Attorney, Agent, or Firm* — Wenderoth, Lind & Ponack, L.L.P.

(57) ABSTRACT

First to third electrode layers (1) are laminated. A dielectric (22) disposed between the second and third electrode layers can be elastically deformed by pressing force from the first electrode layer-side to reduce distance between the second and third electrode layers. The first electrode layer is composed of first electrodes (Rxc) along a first direction (X). The second electrode layer is composed of second electrodes (Txcf) along a second direction (Y) intersecting the first direction. The third electrode layer is composed of third electrodes (Rxf) along a third direction (X) intersecting the second direction. During position-detection, the second electrodes (Txcf) function as transmission-side position-detection electrodes and the first electrodes function as reception-side position detection electrodes to constitute a mutual-capacitance touch panel unit (31). During force-detection, the second electrodes function as transmission-side force-detection electrodes and the third electrodes function as reception-side force-detection electrodes to constitute a cross-point electrostatic-capacitance touch panel unit (32).

3 Claims, 24 Drawing Sheets

(56) References Cited

U.S. PATENT DOCUMENTS

2015/0153887 A1  6/2015  Kim et al.
2016/0109998 A1* 4/2016  Watanabe ............. G06F 3/0412
                                                349/12

* cited by examiner

MULTIFUNCTION TOUCH PANEL

TECHNICAL FIELD

The present invention relates to a multifunction touch panel, constituted of a position detection touch panel unit and a force detection touch panel unit laminated together, that detects a position and a force.

BACKGROUND ART

Conventionally, various touch panel structures in which a plurality of types of touch panels are laminated together in order to provide multiple functions are known. For example, Patent Document 1 discloses a structure in which a capacitive touch panel is laminated upon a resistive touch panel.

CITATION LIST

Patent Literature

Patent Document 1; Japanese Unexamined Patent Application Publication No. H7-334308A

SUMMARY OF INVENTION

Technical Problem

However, with the structure described above, two types of touch panels are simply laminated together. This means that each panel requires electrode layers, leading to a problem in that the overall thickness of the panel increases.

As such, an advantage of some aspects of the present invention is to provide a multifunction touch panel in which some of the electrodes in two switches have dual functionality in order to reduce the number of members used and thus reduce the thickness of the device as a whole, for solving the problem described above.

Solution to Problem

The present invention is configured as follows to achieve the object described above.

A first aspect of the present invention provides a multifunction touch panel including: a first electrode layer, a second electrode layer, and a third electrode layer laminated in sequence so as to be electrically insulated from each other; and a dielectric, disposed between the second electrode layer and the third electrode layer and can be elastically deformed by a pressing force from the first electrode layer side to reduce a distance between the second electrode layer and the third electrode layer. The first electrode layer is constituted of a plurality of first electrodes arranged along a first direction. The second electrode layer is constituted of a plurality of second electrodes arranged along a second direction that intersects with the first direction of the first electrode layer. The third electrode layer is constituted of a plurality of third electrodes arranged along a third direction that intersects with the second direction of the second electrode layer. During position detection, the second electrodes function as transmission-side position detection electrodes and the first electrodes function as reception-side position detection electrodes, and the second electrodes and the first electrodes constitute a projection-type mutual capacitance touch panel unit and carry out position detection. During force detection, the second electrodes function as transmission-side force detection electrodes and the third electrodes function as reception-side force detection electrodes, and the second electrodes and the third electrodes constitute a cross-point electrostatic capacitance touch panel unit and carry out force detection on the basis of a change in the distance between the second electrode layer and the third electrode layer caused by the pressing force from the first electrode layer side.

Advantageous Effects of Invention

According to the first aspect of the present invention, the second electrodes function as the transmission-side position detection electrodes during position detection and the second electrodes function as the transmission-side force detection electrode during force detection. As such, the number of electrodes can be reduced by one with certainty, and the device as a whole can thus be made thinner.

DESCRIPTION OF EMBODIMENTS

Hereinafter, embodiments of the present invention will be described in detail with reference to the drawings.

First Embodiment

Figure 1A:
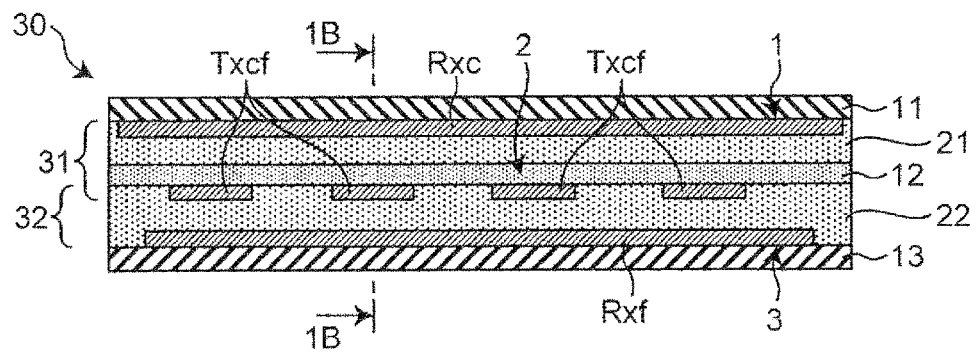
FIG. 1A is a horizontal cross-sectional view of a multifunction touch panel according to a first embodiment of the present invention.
Figure 1B:
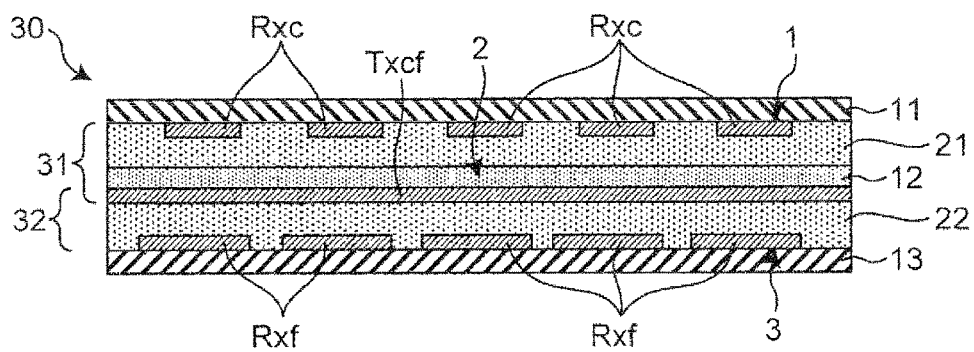
FIG. 1B is a cross-sectional view taken along a line 1B-1B in FIG. 1A.
Figure 2A:
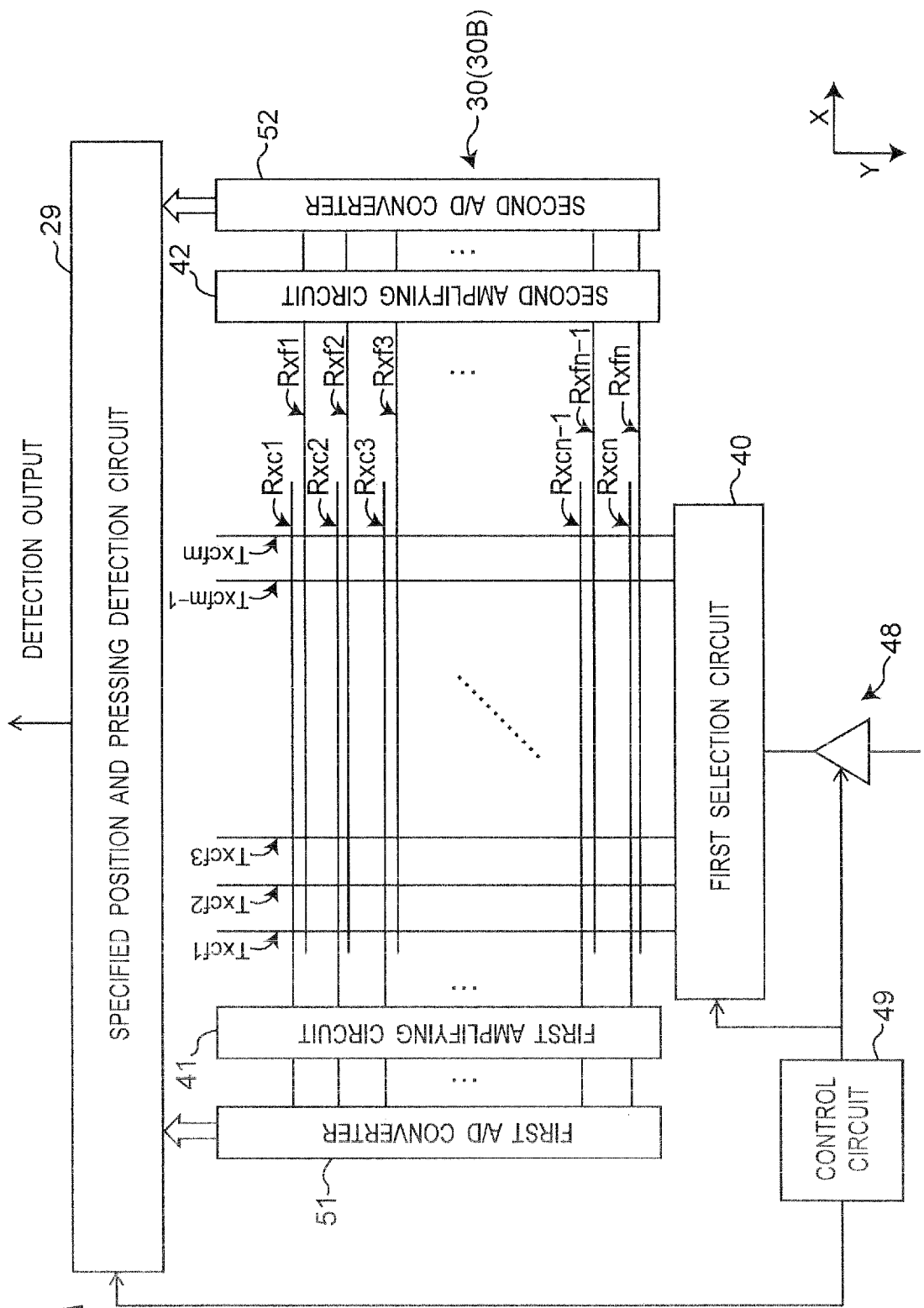
FIG. 2A is a circuit block diagram illustrating a multifunction touch panel.

First, a multifunction touch panel 30 according to a first embodiment of the present invention is illustrated in FIGS. 1A and 1B. FIG. 1A is a horizontal cross-sectional view of the multifunction touch panel 30, and FIG. 1B is a cross-sectional view taken along a line 1B-1B in FIG. 1A. FIG. 2A is a circuit block diagram illustrating the multifunction touch panel 30.

The multifunction touch panel 30 has a three-layer structure of electrode layers. In other words, the multifunction touch panel 30 is constituted of a rectangular laminated body including a first electrode layer 1, a second electrode layer 2, and a third electrode layer 3 laminated together in that order with the layers electrically insulated from each other. A dielectric (second dielectric) 22 that can be elastically deformed by a pressing force applied from the first electrode layer side to reduce the distance between the second electrode layer 2 and the third electrode layer 3 is disposed between at least the second electrode layer 2 and the third electrode layer 3. To be more specific, in the multifunction touch panel 30 illustrated in FIGS. 1A and 1B, a first insulating sheet 11, the first electrode layer 1, a dielectric (first dielectric) 21, a second insulating sheet 12, the second electrode layer 2, the second dielectric 22, the third electrode layer 3, and a third insulating sheet 13 are laminated in that order from a pressed side. FIG. 2A is a transparent view for facilitating understanding of the positional relationships between the electrode layers 1, 2, and 3. Note that the right direction corresponds to the positive X direction and the downward direction corresponds to the positive Y direction.

The first insulating sheet 11 is a flexible insulating sheet disposed on a pressing operation side.

The first electrode layer 1 is disposed between the first insulating sheet 11 and the first dielectric 21, and is fixed to a bottom surface of the first insulating sheet 11, for example.

Figure 2B:
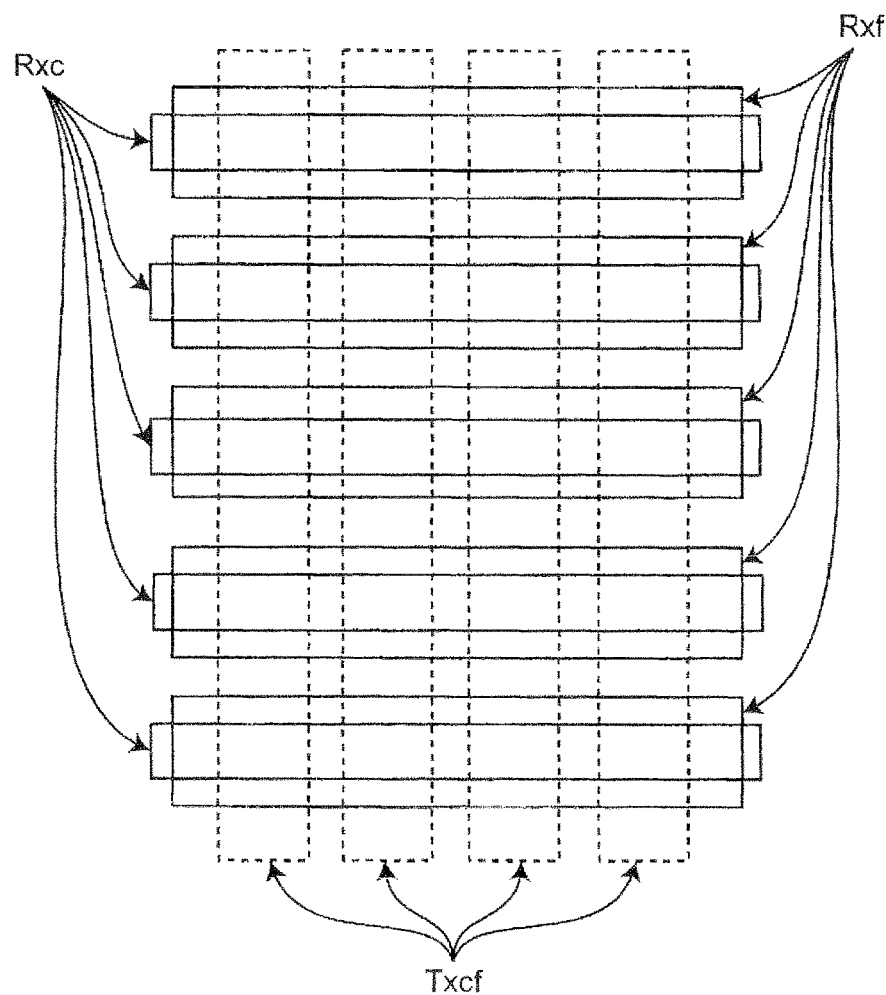
FIG. 2B is a schematic view illustrating an example of a pattern of electrodes.

As illustrated in FIG. 2B, the first electrode layer 1 is constituted of adjacent electrodes extending along a first direction (an X axis direction, for example), that is, a plurality of band-shaped first electrodes Rxc (Rxc1, Rxc2, and so on up to Rxcn) arranged at set intervals from each other in a second direction (a Y axis direction, for example) so as to be electrically insulated from each other. Note that n is the total number of the first electrodes Rxc.

The first dielectric 21 is disposed below the first insulating sheet 11, and is configured to be flexible. For example, an Optical Clear Adhesive (OCA) can be used as the first dielectric 21.

The second insulating sheet 12 is a flexible insulating sheet disposed below the first dielectric 21.

The second electrode layer 2 is disposed between the second insulating sheet 12 and the second dielectric 22, and is fixed to a bottom surface of the second insulating sheet 12, for example. Assuming the second electrode layer 2 can remain insulated from the first electrode layer 1, the second electrode layer 2 may be disposed on a top surface of the second insulating sheet 12.

As illustrated in FIG. 2B, the second electrode layer 2 is constituted of adjacent electrodes extending in the second direction (the Y axis direction, for example), which intersects with the first direction of the first electrode layer 1, that is, a plurality of band-shaped second electrodes Txcf (Txcf1, Txcf2, and so on up to Txcfm) arranged at set intervals from each other in the first direction so as to be electrically insulated from each other. Note that m is the total number of the second electrodes Txcf. The first direction and the second direction intersect at 90 degrees, for example.

The second dielectric 22 is a flexible sheet disposed below the second insulating sheet 12. The dielectric 22 can be constituted of urethane foam, for example, which enables the dielectric 22 to function as an electrode surface protective layer as well. In the case where electrodes are disposed on the dielectric 22 having urethane foam, the electrodes are preferably affixed to both surfaces of the dielectric 22 using Optical Clear Adhesive or the like. Urethane foam is elastic and thus has a self-restoring action in response to pressure.

The third insulating sheet 13 is a flexible insulating sheet disposed below the second dielectric 22.

The third electrode layer 3 is disposed between the second dielectric 22 and the third insulating sheet 13, and is fixed to a top surface of the third insulating sheet 13, for example.

As illustrated in FIG. 2B, the third electrode layer 3 is constituted of adjacent electrodes extending along a third direction (the X axis direction, for example), which intersects with the second direction of the second electrode layer 2, that is, a plurality of band-shaped third electrodes Rxf (Rxf1, Rxf2, and so on up to Rxfn) arranged at set intervals from each other in the second direction so as to be electrically insulated from each other. Note that n is the total number of the third electrodes Rxf. The second direction and the third direction intersect at 90 degrees, for example. Note also that this third insulating sheet 13 need not be flexible.

This layered-structure multifunction touch panel 30 further includes a control circuit 49, functioning as an example of a controller, a first selection circuit 40, a first amplifying circuit 41, a first A/D converter 51, a second amplifying circuit 42, a second A/D converter 52, a specified position and pressing detection circuit 29, and a transmission signal driving circuit (signal generating circuit) 48. As will be described below, the multifunction touch panel 30 functions as a projection-type mutual capacitance touch panel unit 31 and a cross point electrostatic capacitance touch panel unit 32.

All of the plurality of band-shaped second electrodes Txcf (Txcf1, Txcf2, and so on up to Txcfm) are connected to the first selection circuit 40. All of the first electrodes Rxc (Rxc1, Rxc2, and so on up to Rxcn) are connected to the first amplifying circuit 41 and the first A/D converter 51. All of the third electrodes Rxf (Rxf1, Rxf2, and so on up to Rxfn) are connected to the second amplifying circuit 42 and the second A/D converter 52. The first A/D converter 51, the second A/D converter 52, and the control circuit 49 are connected to the specified position and pressing detection circuit 29.

The control circuit 49 is connected to the first selection circuit 40, the transmission signal driving circuit (signal generating circuit) 48, and the specified position and pressing detection circuit 29.

Thus under the control of the control circuit 49, during position detection and force detection, a driving signal is inputted into the first selection circuit 40 from the transmission signal driving circuit (signal generating circuit) 48, and driving signals are then sequentially outputted from the first selection circuit 40 to the second electrode Txcf1, Txcf2, and so on up to Txcfm.

During position detection, the second electrodes Txcf function as transmission-side position detection electrodes and the first electrodes Rxc function as reception-side position detection electrodes. The second electrodes Txcf and the first electrodes Rxc constitute the projection-type mutual capacitance touch panel unit 31 to carry out the position detection. The projection-type mutual capacitance touch panel unit 31 detects a position touched by a conductive body such as a finger and the presence/absence of input. Specifically, under the control of the control circuit 49, the driving signals are sequentially outputted from the first selection circuit 40 to the second electrode Txcf1, Txcf2, and so on up to Txcfm, and at that time, signals detected by the first electrodes Rxc (Rxc1, Rxc2, and so on up to Rxcn) are amplified by the first amplifying circuit 41. The signals amplified by the first amplifying circuit 41 are A/D converted by the first A/D converter 51. Then, the digital signals obtained from the A/D conversion are inputted to the specified position and pressing detection circuit 29. The specified position and pressing detection circuit 29 detects an input position on the basis of the driving signals from the transmission signal driving circuit (signal generating circuit) 48, which were inputted from the control circuit 49, and the digital signals obtained from the conversion carried out by the first A/D converter 51.

On the other hand, during force detection, the second electrodes Txcf function as transmission-side force detection electrodes and the third electrodes Rxf function as reception-side force detection electrodes. The second electrodes Txcf and the third electrodes Rxf constitute the cross point electrostatic capacitance touch panel unit 32 to detect a force on the basis of a change in the distance between the second electrodes Txcf and the third electrodes Rxf caused by a pressing force from the first electrode layer side. The cross point electrostatic capacitance touch panel unit 32 detects the force at a position pressed by a non-conductive body such as a stylus. Specifically, under the control of the control circuit 49, the driving signals are sequentially outputted from the first selection circuit 40 to the second electrode Txcf1. Txcf2, and so on up to Txcfm. and at that time, signals detected by the third electrodes Rxf (Rxf1, Rxf2, and so on up to Rxfn) are amplified by the second amplifying circuit 42. The signals amplified by the second amplifying circuit 42 are A/D converted by the second A/D converter 52. Then, the digital signals obtained from the A/D conversion are inputted to the specified position and pressing detection circuit 29. The specified position and pressing detection circuit 29 detects an inputted pressing force on the basis of the driving signals from the transmission signal driving circuit (signal generating circuit) 48, which were inputted from the control circuit 49, and the digital signals obtained from the conversion carried out by the second A/D converter 52.

Employing a configuration in which two different types of touch panel units, namely the projection-type mutual capacitance touch panel unit 31 and the cross point electrostatic capacitance touch panel unit 32, are laminated one upon the other, and having the second electrodes Txcf functioning in both, makes it possible to achieve both functions with a compact structure.

The first electrodes Rxc, the second electrodes Txcf, and the third electrodes Rxf can be formed from a material exhibiting electrical conductivity, and may be transparent or non-transparent. A transparent conductive oxide such as Indium-Tin-Oxide (ITO) or Tin-Zinc-Oxide (TZO), a conductive polymer such as polyethylene dioxythiophene (PE-DOT), or the like can be used as the material exhibiting electrical conductivity. In this case, the electrodes can be formed using deposition, screen printing, or the like.

A conductive metal such as copper or silver may be used as the material exhibiting electrical conductivity. In this case, the electrodes may be formed through deposition, or may be formed using a metal paste such as copper paste or silver paste.

Furthermore, a material in which a conductive material such as carbon nanotubes, metal particles, or metal nanofibers is dispersed throughout a binder may be used as the material exhibiting electrical conductivity.

Further still, a display device such as a liquid-crystal display or an organic EL display may be disposed below the third insulating sheet 13 of the multifunction touch panel 30.

According to this configuration, the second electrodes Txcf are sequentially driven and signals appearing in the first electrodes Rxc are amplified by the first amplifying circuit 41. Then, on the basis of values obtained by the first A/D converter 51 A/D converting those signals, a position touched on the first insulating sheet 11 side is calculated and outputted from the specified position and pressing detection circuit 29 as a position detection result. Additionally, the second electrodes Txcf are sequentially driven and signals appearing in the third electrodes Rxf are amplified by the second amplifying circuit 42. Then, on the basis of values obtained by the second A/D converter 52 A/D converting those signals into digital signals, a pressing force applied to the first insulating sheet 11 side is calculated and outputted from the specified position and pressing detection circuit 29 as a force detection result.

Figure 2C:
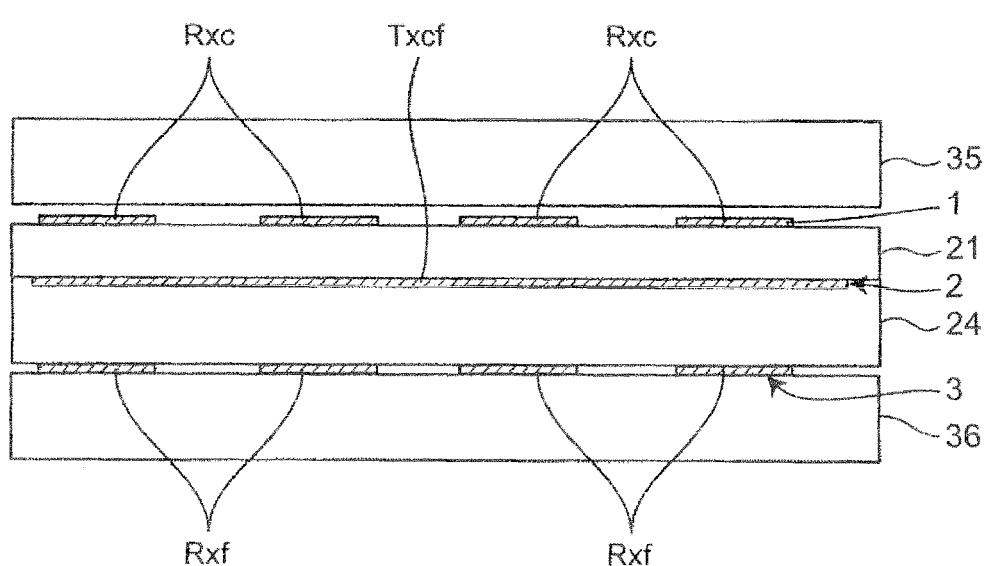
FIG. 2C is a horizontal cross-sectional view of a multifunction touch panel according to another variation of the first embodiment.

According to this first embodiment, some of the electrodes in the two touch panel units 31 and 32 (that is, the second electrodes Txcf) have dual functionality, which makes it possible to reduce the number of members used and make the device thinner as a whole. In other words, as illustrated in FIG. 2C, for example, which is one variation of the first embodiment, the first electrode layer 1 may be disposed on a top surface of a flexible first insulating sheet 21 on the pressed side, and the second electrode layer 2 may be disposed on a bottom surface side of the first insulating sheet 21 (a particular case where ITO electrodes are formed on both surfaces of a sheet is referred to as Double-Sided ITO (DITO)). Additionally, the third electrode layer 3 may be disposed on a top surface of the third insulating sheet 13, which itself is disposed on the opposite side of a dielectric 24 as the side on which the first insulating sheet 11 is disposed. The dielectric 24 may be an air layer or may be formed from the same material as the dielectric 22. A first insulating layer 35 in the uppermost layer is a flexible insulating sheet disposed in the uppermost layer. A second insulating layer 36 in the lowermost layer is a flexible insulating sheet disposed in the lowermost layer. The first insulating layer 35 may be constituted of a plastic film such as PET, polycarbonate, or polyimide, or of thin glass, for example. Meanwhile, the second insulating layer 36 may be constituted of a plastic plate, a glass plate, or a surface of the display device.

Figure 1C:
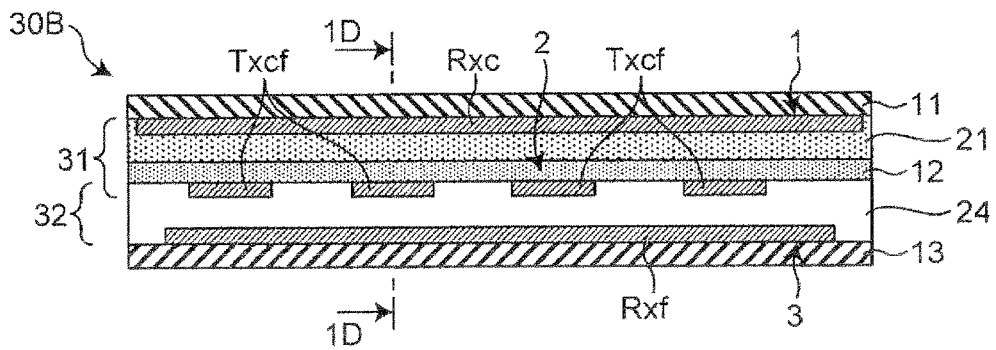
FIG. 1C is a horizontal cross-sectional view of a multifunction touch panel according to a variation of the first embodiment of the present invention.
Figure 1D:
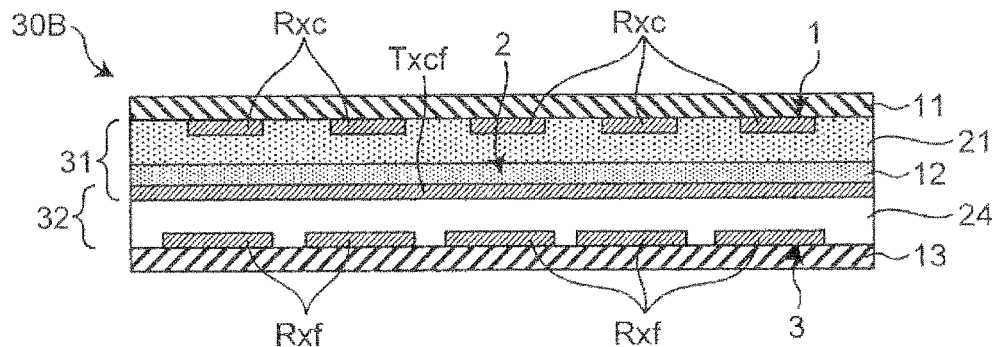
FIG. 1D is a cross-sectional view taken along a line 1D-1D in FIG. 1C.

As a variation on the first embodiment, the second dielectric 22 may be constituted of an air layer 24, as illustrated in FIGS. 1C and 1D. In other words, in the configuration illustrated in FIGS. 1C and 1D, the first electrode layer 1 may be disposed on the top surface of the flexible first insulating sheet 21 on the pressed side, and the second electrode layer 2 may be disposed on the bottom surface side of the first insulating sheet 21. Additionally, the third electrode layer 3 may be disposed on the top surface of the third insulating sheet 13, which itself is disposed on the opposite side of the dielectric 24 as the side on which the first insulating sheet is disposed. According to this configuration, the number of members (layers) constituting the touch panel can be reduced, which makes it possible to improve the thickness and optical properties.

Figure 4A:
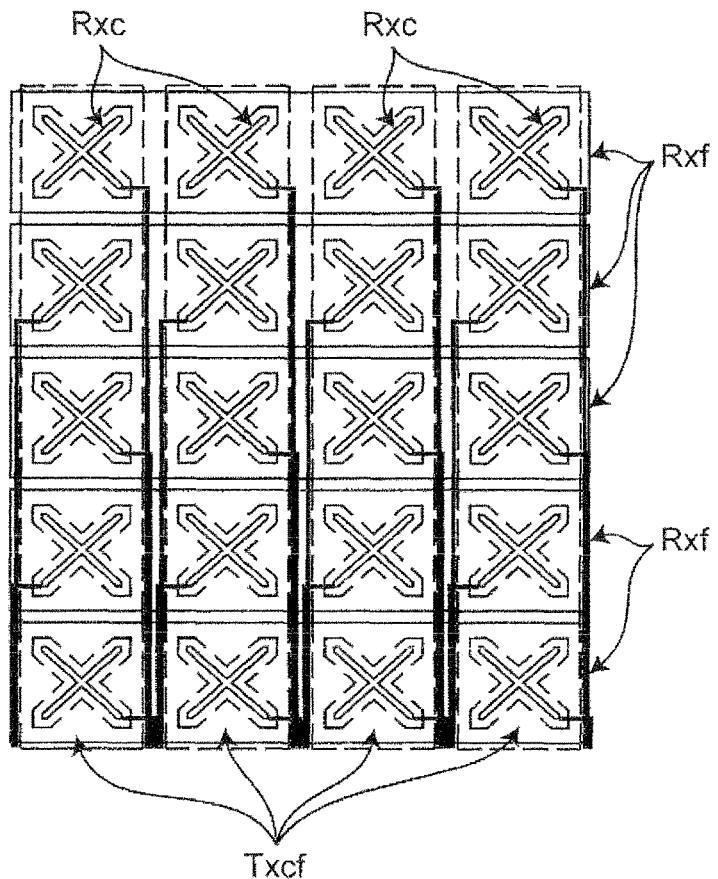
FIG. 4A is a schematic view illustrating an example of another pattern of electrodes.
Figure 4B:
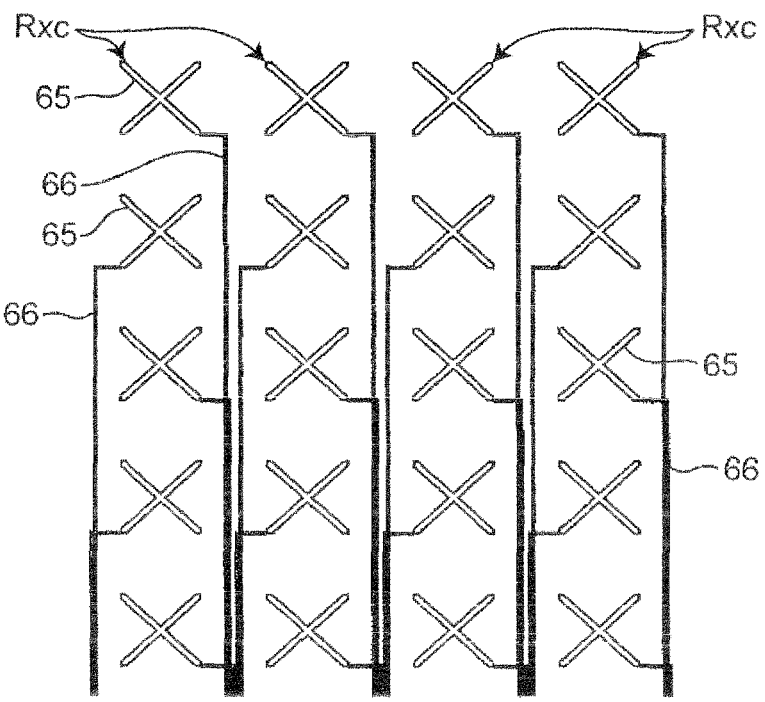
FIG. 4B is a schematic view illustrating an example of a pattern of electrodes Rxc in FIG. 4A.
Figure 4C:
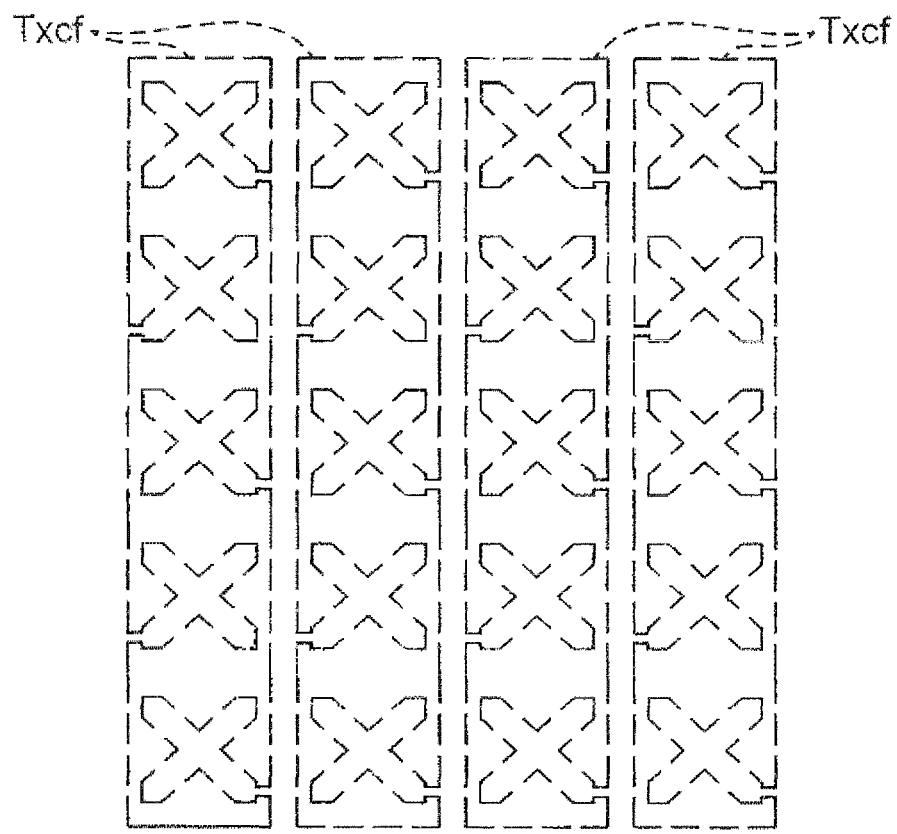
FIG. 4C is a schematic view illustrating an example of a pattern of electrodes Txcf in FIG. 4A.
Figure 4D:
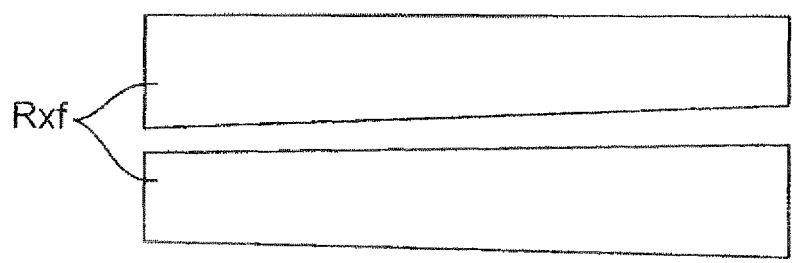
FIG. 4D is a schematic view illustrating an example of another pattern of electrodes Rxf.

Note that in addition to the rectangular band-shaped electrode body portions illustrated in FIG. 2B, the third electrodes Rxf may be constituted of trapezoidal electrode body portions as illustrated in FIG. 4D.

Second Embodiment

Figure 3A:
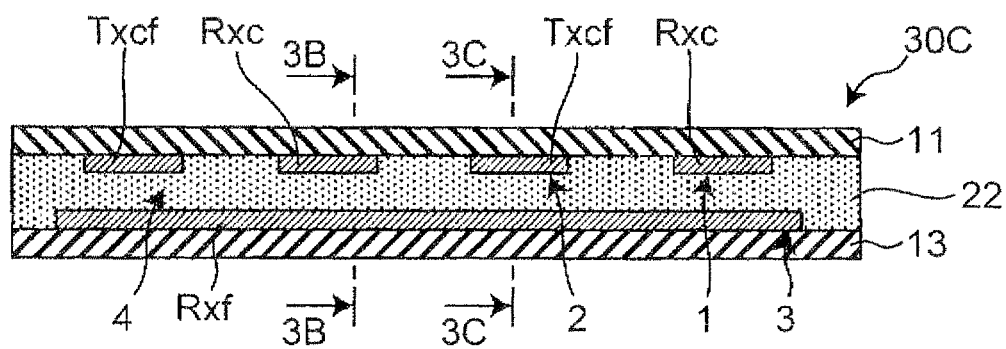
FIG. 3A is a horizontal cross-sectional view of a multifunction touch panel according to a second embodiment of the present invention.
Figure 3B:
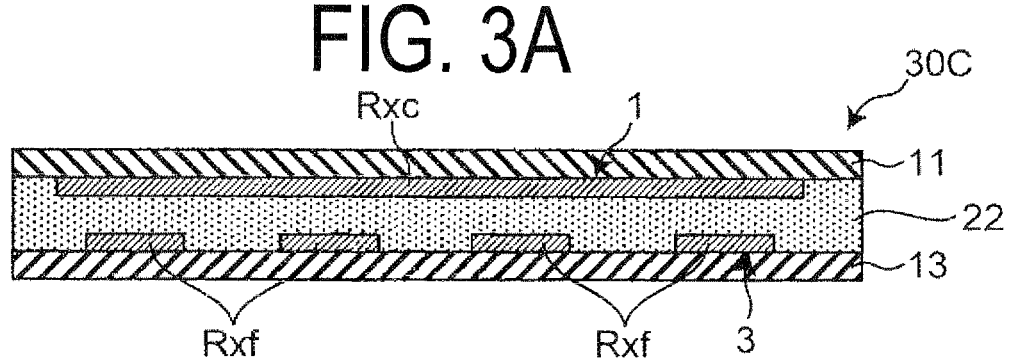
FIG. 3B is a cross-sectional view taken along a line 3B-3B in FIG. 3A.
Figure 3C:
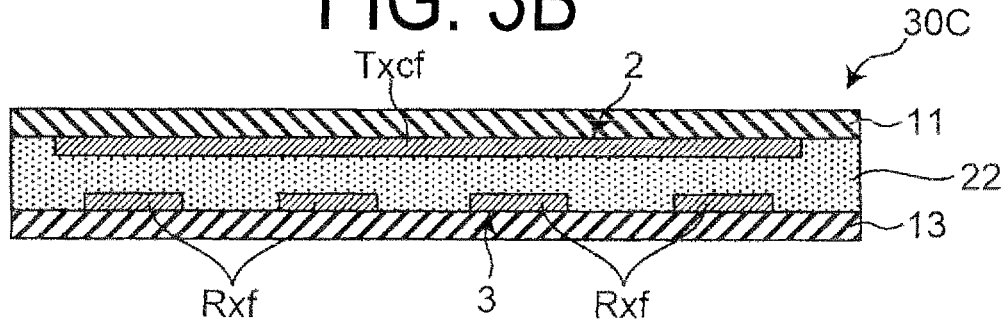
FIG. 3C is a cross-sectional view taken along a line 3C-3C in FIG. 3A.
Figure 5:
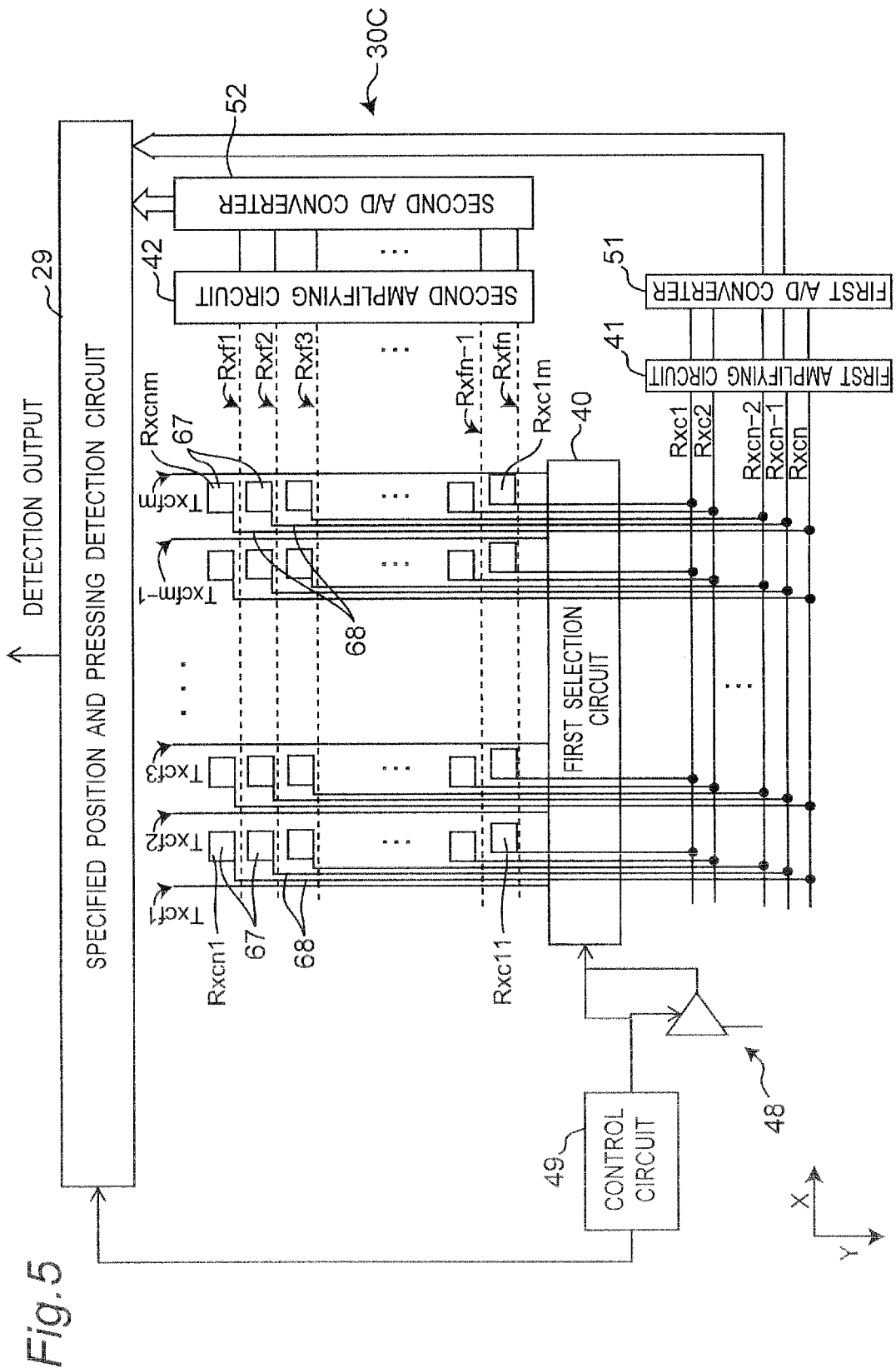
FIG. 5 is a circuit block diagram illustrating the multifunction touch panel according to the second embodiment.

A multifunction touch panel 30C according to a second embodiment of the present invention is illustrated in FIGS. 3A, 3B, and 3C. FIG. 3A is a horizontal cross-sectional view of the multifunction touch panel 30C, FIG. 3B is a cross-sectional view taken along a line 3B-3B in FIG. 3A, and FIG. 3C is a cross-sectional view taken along a line 3C-3C in FIG. 3A. FIG. 5 is a circuit block diagram illustrating the multifunction touch panel 30C.

The multifunction touch panel 30C has a two-layer structure of electrode layers. In other words, the multifunction touch panel 30C is constituted of the first insulating sheet 11, the first electrode layer 1 and second electrode layer 2, the second dielectric 22, the third electrode layer 3, and the third insulating sheet 13 laminated together.

The first electrode layer 1 and the second electrode layer 2 are provided on the bottom surface of the first insulating sheet 11, within the same plane, so as to be electrically insulated from each other.

The third electrode layer 3 is disposed such that the second dielectric 22 is interposed between the third electrode layer 3, and the first and second electrodes layers 1 and 2. In other words, the third electrode layer 3 is disposed on the top surface of the third insulating sheet 13.

The dielectric 22 that can be elastically deformed by a pressing force applied from the first electrode layer 1 side or the second electrode layer 2 side to reduce the distance between the second electrode layer 2 and the third electrode layer 3 is disposed between the first and second electrode layers 1 and 2, and the third electrode layer 3.

The third electrode layer 3 is constituted of a plurality of band-shaped third electrodes Rxf (Rxf1, Rxf2, and so on up to Rxfn) that extend along a first direction (the X axis direction, for example) and are arranged at set intervals from each other in a second direction (the Y axis direction, for example) so as to be electrically insulated from each other. Note that n is the total number of the third electrodes Rxf. The third electrodes Rxf are each connected to the second amplifying circuit 42.

The second electrode layer 2 is constituted of a plurality of band-shaped second electrodes Txcf (Txcf1, Txcf2, and so on up to Txcfm) that extend along the second direction (the Y axis direction, for example) and are arranged at set intervals from each other in the first direction (the X axis direction, for example) so as to be electrically insulated from each other. Note that m is the total number of the second electrodes Txcf. All of the plurality of second electrodes Txcf are connected to the first selection circuit 40, which is connected to the control circuit 49.

The first electrode layer 1 is constituted of electrode main body portions 67 (Rxc11 to Rxcnm) and wiring portions 68, serving as the first electrodes Rxc. The electrode main body portions 67 (Rxc11 to Rxcnm) are numerous (m×1, for example) small square electrode main body portions 67 arranged in rows at set intervals from each other in at least the first direction (the X axis direction, for example), and, for example, are numerous (m×n, for example) small square electrode main body portions 67 (Rxc11 to Rxcnm) arranged in a matrix at set intervals from each other in the first direction (the X axis direction, for example) and the second direction (the Y axis direction, for example). The wiring portions 68 connect each of the electrode main body portions 67 to the first amplifying circuit 41.

In FIG. 5, the m electrode main body portions 67 (Rxc11, Rxc12, and so on up to Rxc1m) arranged along the first direction (the X axis direction, for example) and the wiring portions 68 connected thereto all correspond to the same electrode (a first electrode Rxc1, for example). These electrodes are arranged in the second direction (the Y axis direction, for example) so as to constitute the plurality of first electrodes Rxc (Rxc1 to Rxcn). Note that n is the total number of the first electrodes Rxc. All of the plurality of first electrodes Rxc are connected to the first amplifying circuit 41 by the wiring portions 68. Note that n and m are independent integers of 1 or greater. The numbers expressed by n and m can be increased to increase the number of electrodes, which makes it possible to more accurately detect positions and pressures.

The electrode pattern illustrated in FIGS. 6A to 6D, which is formed through patterning, may be used as an electrode pattern according to the second embodiment.

Figure 6A:
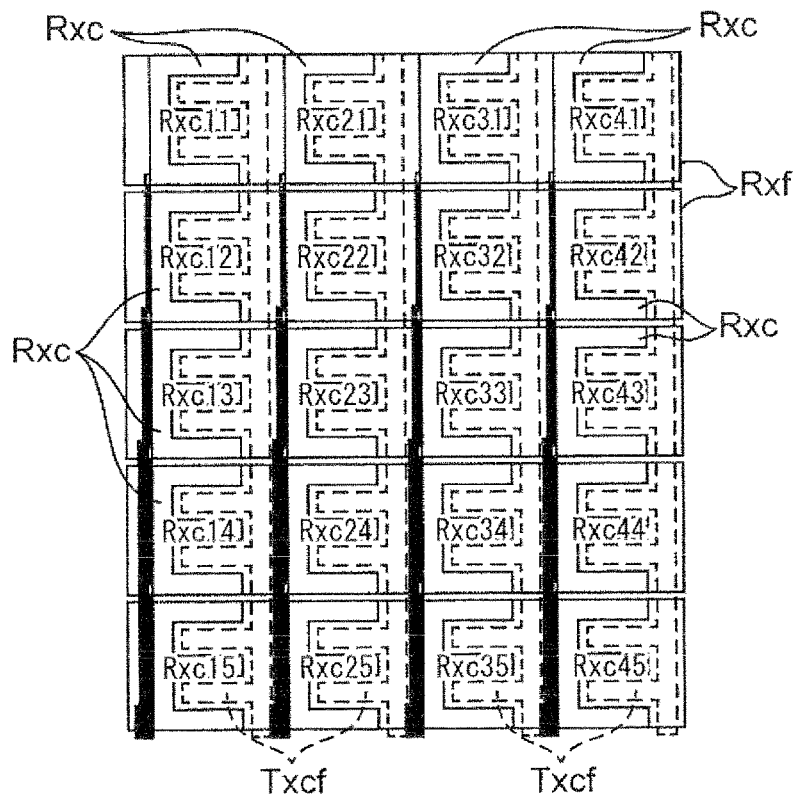
FIG. 6A is a schematic view illustrating an example of a pattern of electrodes.
Figure 6B:
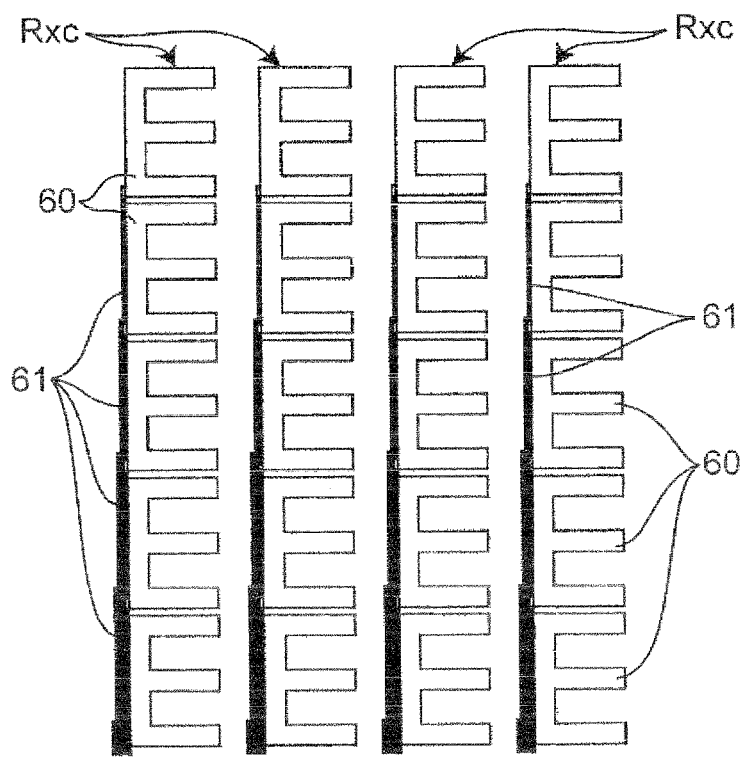
FIG. 6B is a schematic view illustrating an example of a pattern of electrodes Rxc in FIG. 6A.

That is, as illustrated in FIGS. 6A and 6B, the first electrode layer 1 is constituted of, as the first electrodes Rxc, numerous (m×n, for example) small E-shaped electrode main body portions 60 (Rxc11 to Rxcnm) arranged in a matrix at set intervals from each other in the first direction (the X axis direction, for example) and the second direction (the Y axis direction, for example), and wiring portions 61 that connect each of the electrode main body portions 60 to the first amplifying circuit 41. The electrode main body portions 60 and the wiring portions 61 correspond to examples of the electrode main body portions 67 and the wiring portions 68, respectively.

Figure 6C:
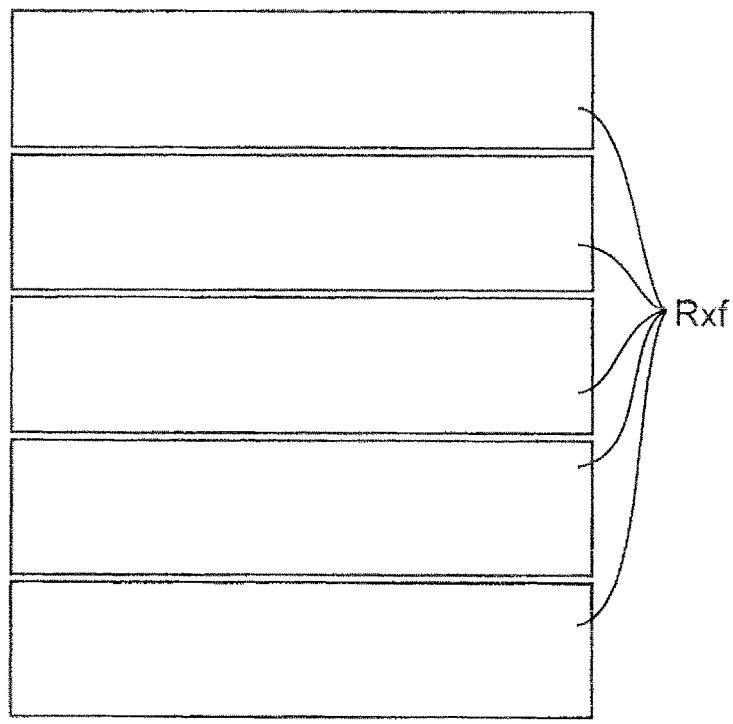
FIG. 6C is a schematic view illustrating an example of a pattern of electrodes Txcf in FIG. 6A.

As illustrated in FIGS. 6A and 6C, the third electrode layer 3 is constituted of a plurality of band-shaped third electrodes Rxf (Rxf1, Rxf2, and so on up to Rxfn) that extend along the first direction (the X axis direction, for example) and are arranged at set intervals from each other in the second direction (the Y axis direction, for example) so as to be electrically insulated from each other. Note that n is the total number of the third electrodes Rxf. The third electrodes Rxf are each connected to the second amplifying circuit 42.

Figure 6D:
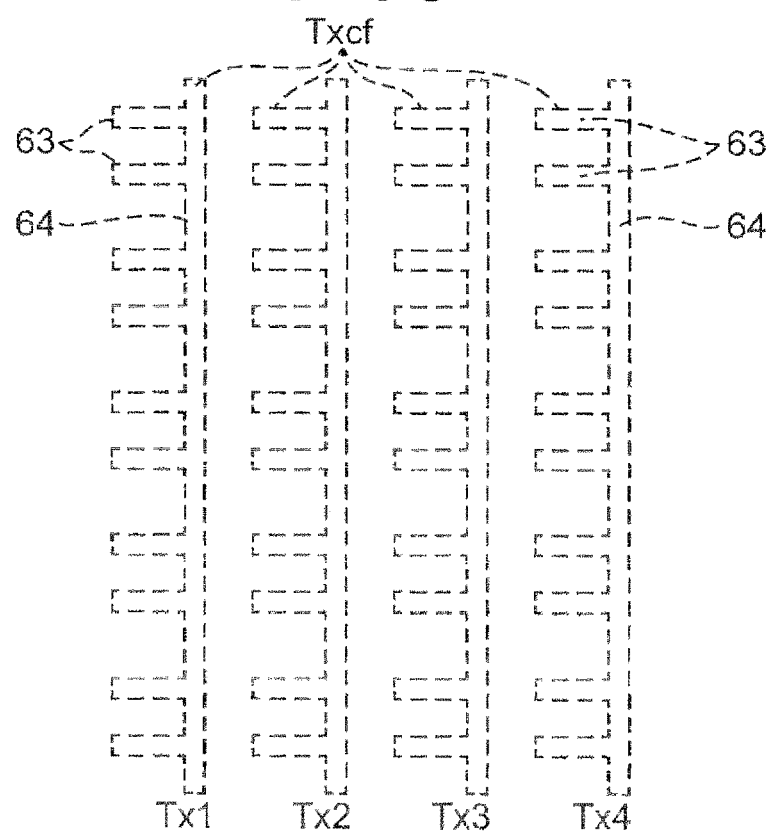
FIG. 6D is a schematic view illustrating an example of a pattern of electrodes Rxf in FIG. 6A.

As illustrated in FIGS. 6A and 6D, the second electrode layer 2 is constituted of, as the plurality of second electrodes Txcf (Txcf1. Txcf2, and so on up to Txcfm), branched electrode portions 63, each having two narrow parts that fit into the gaps in the corresponding E-shaped electrode main body portions 60 of the first electrodes Rxc, extending along the second direction (the Y axis direction, for example) and arranged at set intervals from each other in the first direction (the X axis direction, for example), so as to be electrically insulated from each other; and wiring portions 64 that connect the branched electrode portions 63 to the first selection circuit 40. Note that m is the total number of the second electrodes Txcf. All of the plurality of second electrodes Txcf are connected to the first selection circuit 40, which is connected to the control circuit 49.

Forming the electrodes in an E-shape in this manner makes it possible to combine transmission side electrodes and reception side electrodes in a comb-tooth shape, which in turn makes it possible to increase the electrostatic capacitance between the transmission side electrodes and the reception side electrodes.

Thus according to the multifunction touch panel 30C, under the control of the control circuit 49, during position detection and force detection, a driving signal is inputted into the first selection circuit 40 from the transmission signal driving circuit (signal generating circuit) 48, and driving signals are then sequentially outputted from the first selection circuit 40 to the second electrode Txcf1, Txcf2, and so on up to Txcfm.

During position detection, the second electrodes Txcf function as transmission-side position detection electrodes and the first electrodes Rxc function as reception-side position detection electrodes. The second electrodes Txcf and the first electrodes Rxc constitute the projection-type mutual capacitance touch panel unit 31 to carry out the position detection.

On the other hand, during force detection, the second electrodes Txcf function as transmission-side force detection electrodes and the third electrodes Rxf function as reception-side force detection electrodes. The second electrodes Txcf and the third electrodes Rxf constitute the cross point, electrostatic capacitance touch panel unit 32 to detect a force on the basis of a change in the distance between the second electrodes Txcf and the third electrodes Rxf caused by a pressing force from the side of the first electrodes Rxc or the second electrodes Txcf.

According to this second embodiment, some of the electrodes in the two touch panel units 31 and 32 (that is, the second electrodes Txcf) have dual functionality, which makes it possible to reduce the number of members used and make the device thinner as a whole.

Meanwhile, as another variation of the second embodiment, the electrode pattern illustrated in FIGS. 4A to 4D may be used. That is, as illustrated in FIGS. 4A and 4B, the first electrodes Rxc are each constituted of X-shaped electrode main body portions 65, and wiring portions 66 that connect the electrode main body portions 65 to the first amplifying circuit 41. As illustrated in FIGS. 4A and 6C, the third electrodes Rxf are each constituted of rectangular band-shaped electrode main body portions, and the respective electrode main body portions are connected to the second amplifying circuit 42. As illustrated in FIGS. 4A and 4C, the second electrodes Txcf are constituted of electrode main body portions having a shape obtained by punching out the X-shaped electrode main body portions 65 of the first electrodes Rxc from a rectangular band shape, and are configured to be connected to the first selection circuit 40.

Third Embodiment

Figure 7:
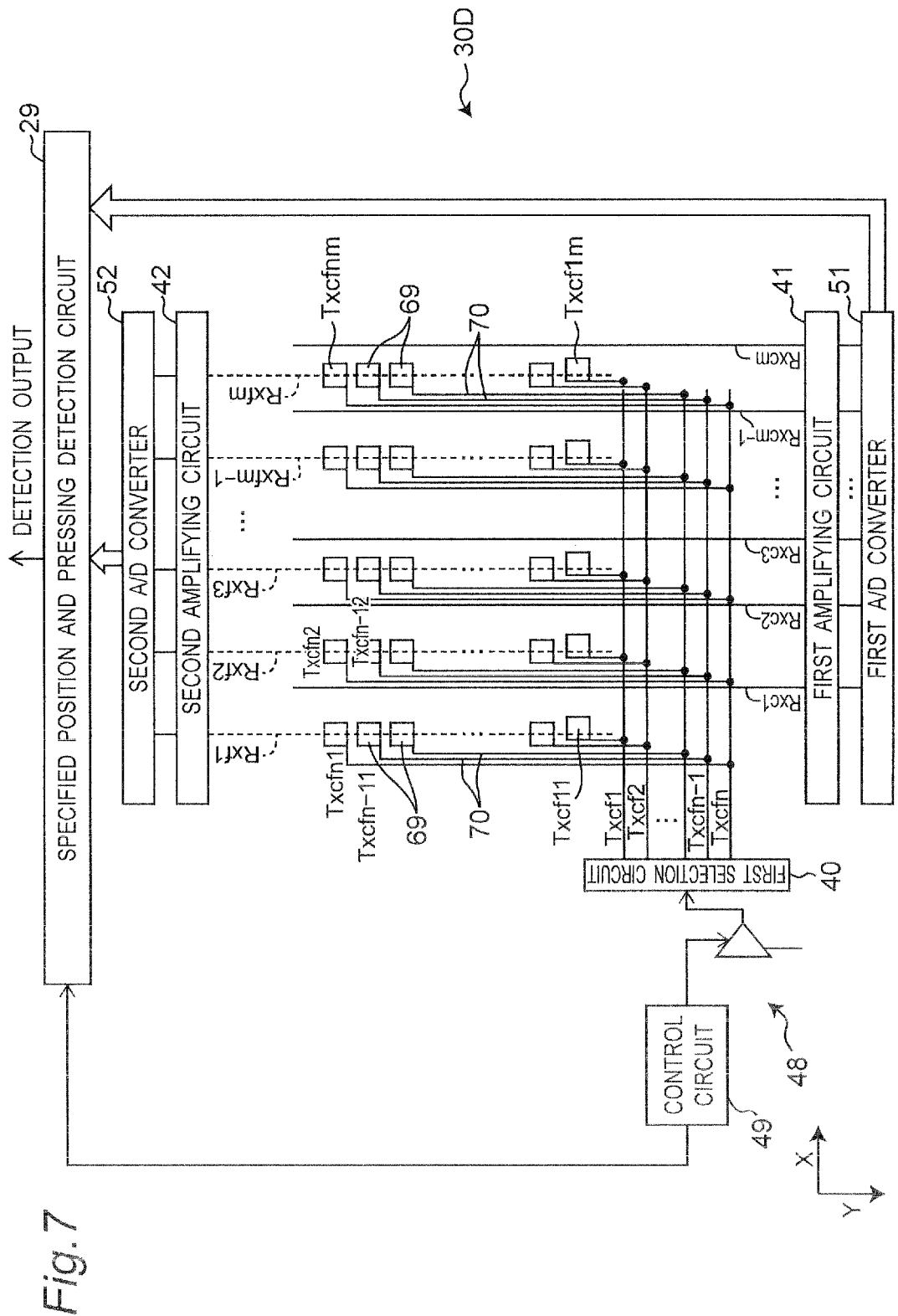
FIG. 7 is a circuit block diagram illustrating a multifunction touch panel according to a third embodiment.

A multifunction touch panel 30D according to a third embodiment of the present invention, in which the second electrodes Txcf are divided into numerous parts rather than the first electrodes Rxc as in the second embodiment, is illustrated by the circuit block diagram in FIG. 7. A cross-sectional view of the multifunction touch panel 30D according to the third embodiment is the same as FIGS. 3A, 3B, and 3C illustrating the multifunction touch panel 30C according to the second embodiment.

The third electrode layer 3 is constituted of a plurality of band-shaped third electrodes Rxf (Rxf1, Rxf2, and so on up to Rxfm) that extend along the second direction (the Y axis direction, for example) and are arranged at set intervals from each other in the first direction (the X axis direction, for example) so as to be electrically insulated from each other. Note that m is the total number of the third electrodes Rxf.

The first electrode layer 1 is also constituted of a plurality of band-shaped first electrodes Rxc (Rxc1. Rxc2, and so on up to Rxcm) that extend along the second direction (the Y axis direction, for example) and are arranged at set intervals from each other in the first direction (the X axis direction, for example) so as to be electrically insulated from each other. Note that m is the total number of the first electrodes Rxc.

The second electrode layer 2 is constituted of electrode main body portions 69 (Txcf11 to Txcfnm) and wiring portions 70 serving as the second electrodes Txcf. The electrode main body portions 69 (Txcf11 to Txcfnm) are numerous (m×1, for example) small square electrode main body portions 69 arranged in rows at set intervals from each other in at least the first direction (the X axis direction, for example), and, for example, are numerous (m×n, for example) small square electrode main body portions 69 (Txcf11 to Txcfnm) arranged in a matrix at set intervals from each other in the first direction (the X axis direction, for example) and the second direction (the Y axis direction, for example). The wiring portions 70 connect each of the electrode main body portions 69 to the first selection circuit 40.

In FIG. 7, the m electrode main body portions 69 (Txcf11, Txcf12, and so on up to Txcf1$m$) arranged along the first direction (the X axis direction, for example) and the wiring portions 70 connected thereto all correspond to the same electrode (a second electrode Txcf1, for example). These electrodes are arranged in the second direction (the Y axis direction, for example) so as to constitute the plurality of second electrodes Txcf (Txcf1 to Txcfn). Note that n is the total number of the second electrodes Txcf. All of the plurality of second electrodes Txcf are connected to the first selection circuit 40, which is connected to the control circuit 49. The n electrode main body portions 69 arranged along the Y axis direction (for example, Txcf11 and Txcf21 to Txcfn1) are disposed in a position above one of the third electrodes Rxf (for example, Rxf1).

Thus under the control of the control circuit 49, during position detection and force detection, a driving signal is inputted into the first selection circuit 40 from the transmission signal driving circuit (signal generating circuit) 48, and driving signals are then sequentially outputted from the first selection circuit 40 to the second electrode Txcf1, Txcf2, and so on up to Txcfn.

During position detection, the second electrodes Txcf function as transmission-side position detection electrodes and the first electrodes Rxc function as reception-side position detection electrodes. The second electrodes Txcf and the first electrodes Rxc constitute the projection-type mutual capacitance touch panel unit 31 to carry out the position detection. In other words, the signals detected by the first electrodes Rxc are amplified by the first amplifying circuit 41. The signals amplified by the first amplifying circuit 41 are A/D converted by the first A/D converter 51. Then, the digital signals obtained from the A/D conversion are inputted to the specified position and pressing detection circuit 29 to carry out the position detection.

On the other hand, during force detection, the second electrodes Txcf function as transmission-side force detection electrodes and the third electrodes Rxf function as reception-side force detection electrodes. The second electrodes Txcf and the third electrodes Rxf constitute the cross point electrostatic capacitance touch panel unit 32 to detect a force on the basis of a change in the distance between the second electrodes Txcf and the third electrodes Rxf caused by a pressing force from the side of the first electrodes Rxc or the second electrodes Txcf. In other words, the signals detected by the third electrodes Rxf are amplified by the second amplifying circuit 42. The signals amplified by the second amplifying circuit 42 are A/D converted by the second A/D converter 52. Then, the digital signals obtained from the A/D conversion are inputted to the specified position and pressing detection circuit 29 to carry out the force detection.

The third embodiment can therefore achieve the same effects as the first embodiment.

Fourth Embodiment

In the second and third embodiments, the transmission side electrodes are shared and the reception side electrodes are each divided into the first electrode layer and the third electrode layer in each of the touch panel units 31 and 32. However, in a fourth embodiment, the reception side electrodes are constituted by the second electrode layer, and the transmission side electrodes each are disposed individually in the first electrode layer and the third electrode layer in each of the touch panel units 31 and 32.

Figure 8A:
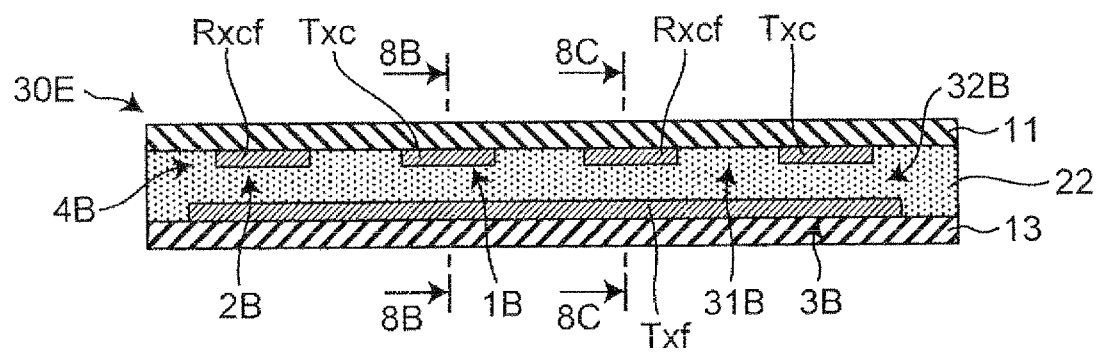
FIG. 8A is a horizontal cross-sectional view of the multifunction touch panel according to the fourth embodiment of the present invention.
Figure 8B:
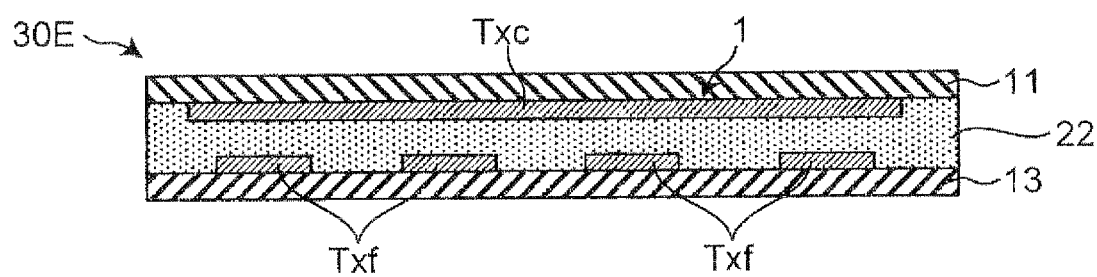
FIG. 8B is a cross-sectional view taken along a line 8B-8B in FIG. 8A.
Figure 8C:
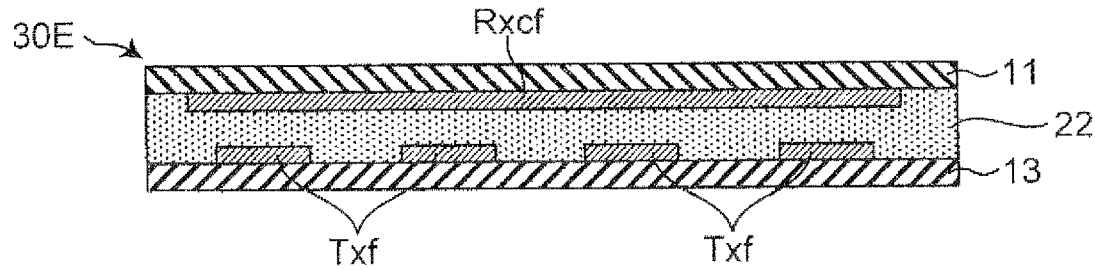
FIG. 8C is a cross-sectional view taken along a line 8C-8C in FIG. 8A.
Figure 9:
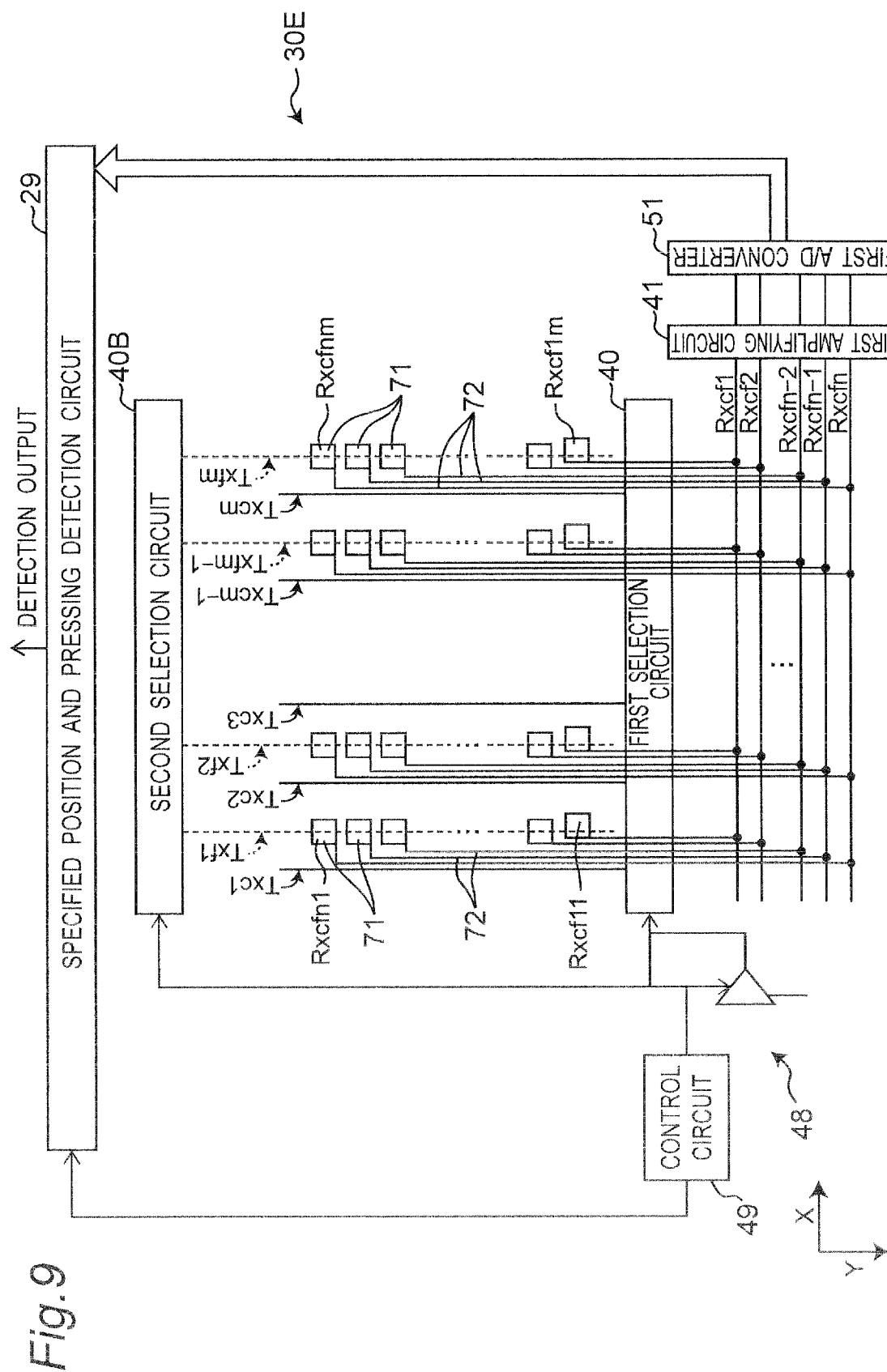
FIG. 9 is a circuit block diagram illustrating a multifunction touch panel according to a fourth embodiment.

A multifunction touch panel 30E according to the fourth embodiment of the present invention is illustrated in FIGS. 8A, 8B, and 8C. FIG. 8A is a horizontal cross-sectional view of the multifunction touch panel 30E, FIG. 8B is a cross-sectional view taken along a line 8B-8B in FIG. 8A, and FIG. 8(C is a cross-sectional view taken along a line 8C-8C in FIG. 8A. FIG. 9 is a circuit block diagram illustrating the multifunction touch panel 30E.

The multifunction touch panel 30E has a two-layer structure of electrode layers. In other words, the multifunction touch panel 30E is constituted of the first insulating sheet 11, a first electrode layer 1B and second electrode layer 2B, the second dielectric 22, a third electrode layer 3B, and the third insulating sheet 13 laminated together.

The first electrode layer 1B and the second electrode layer 2B are provided on the bottom surface of the first insulating sheet 11 or the top surface of the second dielectric 22, within the same plane, so as to be electrically insulated from each other.

The third electrode layer 3B is disposed such that the second dielectric 22 is interposed between the third electrode layer 3B, and the first and second electrodes layers 1B and 2B. In other words, the third electrode layer 3B is disposed on the bottom surface of the second dielectric 22 or the top surface of the third insulating sheet 13.

The dielectric 22 that can be elastically deformed by a pressing force applied from the first electrode layer 1B side or the second electrode layer 2B side to reduce the distance between the second electrode layer 2B and the third electrode layer 3B is disposed between the first and second electrode layers 1B and 2B, and the third electrode layer 3B.

The third electrode layer 3B is constituted of a plurality of band-shaped third electrodes Txf (Txf1, Txf2, and so on up to Txfm) that extend along the second direction (Y), which intersects with the first direction of the second electrode layer 2B (the X axis direction, for example), and are arranged at set intervals from each other in the first direction so as to be electrically insulated from each other. Note that m is the total number of the third electrodes Txf. All of the plurality of third electrodes Txf are connected to a second selection circuit 40B, which is connected to the control circuit 49.

The first electrode layer 1B is constituted of a plurality of band-shaped first electrodes Txc (Txc1, Txc2, and so on up to Txcm) that extend along the second direction (the Y axis direction, for example) and are arranged at set intervals from each other in the first direction (the X axis direction, for example) so as to be electrically insulated from each other. Note that m is the total number of the first electrodes Txc. All of the plurality of first electrodes Txc are connected to the first selection circuit 40, which is connected to the control circuit 49.

The second electrode layer 2B is constituted of electrode main body portions 71 (Rxcf11 to Rxcfnm) and wiring portions 72 serving as second electrodes Rxcf. The electrode main body portions 71 (Rxcf11 to Rxcfnm) are numerous (m×1, for example) small square electrode main body portions 71 arranged in rows at set intervals from each other in at least the first direction (the X axis direction, for example), and, for example, are numerous (m×n, for example) small square electrode main body portions 71 (Rxcf11 to Rxcfnm) arranged in a matrix at set intervals from each other in the first direction (the X axis direction, for example) and the second direction (the Y axis direction, for example). The wiring portions 72 connect each of the electrode main body portions 71 to the first amplifying circuit 41.

In FIG. 9, the m electrode main body portions 71 (Rxcf11, Rxcf12, and so on up to Rxcf1m) arranged along the first direction (the X axis direction, for example) and the wiring portions 72 connected thereto all correspond to the same electrode (a second electrode Rxcf1, for example). These electrodes are arranged in the second direction (the Y axis direction, for example) so as to constitute the plurality of second electrodes Rxcf (Rxcf1 to Rxcfn). Note that n is the total number of the second electrodes Rxcf. All of the plurality of second electrodes Rxcf are connected to the first amplifying circuit 41 by the wiring portions 72. The n electrode main body portions 71 arranged along the Y axis direction (for example, Rxcf11 and Rxcf21 to Rxcfn1) are disposed, for example, in a position above one of the third electrodes Txf (for example, Txf1).

Thus under the control of the control circuit 49, during position detection, a driving signal is inputted into the first selection circuit 40 from the transmission signal driving circuit (signal generating circuit) 48, and driving signals are then sequentially outputted from the first selection circuit 40 to the first electrode Txc1, Txc2, and so on up to Txcm. During this position detection, the first electrodes Txc function as transmission-side position detection electrodes and the second electrodes Rxcf function as reception-side position detection electrodes. The first electrodes Txc and the second electrodes Rxcf constitute a projection-type mutual capacitance touch panel unit 31B to carry out the position detection. In other words, the signals detected by the second electrodes Rxcf are amplified by the first amplifying circuit 41. The signals amplified by the first amplifying circuit 41 are A/D converted by the first A/D converter 51. Then, the digital signals obtained from the A/D conversion are inputted to the specified position and pressing detection circuit 29 to carry out the position detection.

On the other hand, under the control of the control circuit 49, during force detection, a driving signal is inputted into the second selection circuit 40B from the transmission signal driving circuit (signal generating circuit) 48, and driving signals are then sequentially outputted to the third electrode Txf1, Txf2, and so on up to Txfn. During this force detection, the third electrodes Txf function as transmission-side force detection electrodes and the second electrodes Rxcf function as reception-side force detection electrodes. The third electrodes Txf and the second electrodes Rxcf constitute a cross point electrostatic capacitance touch panel unit 32B to detect a force on the basis of a change in the distance between the third electrodes Txf and the second electrodes Rxcf caused by a pressing force from the side of the first electrodes Txf or the second electrodes Rxcf. In other words, the signals detected by the second electrodes Rxcf are amplified by the first amplifying circuit 41. The signals amplified by the first amplifying circuit 41 are A/D converted by the first A/D converter 51. Then, the digital signals obtained from the A/D conversion are inputted to the specified position and pressing detection circuit 29 to carry out the force detection.

According to this fourth embodiment, some of the electrodes in the two touch panel units 31B and 32B (that is, the second electrodes Rxcf) have dual functionality, which makes it possible to reduce the number of members used and make the device thinner as a whole.

Figure 10A:
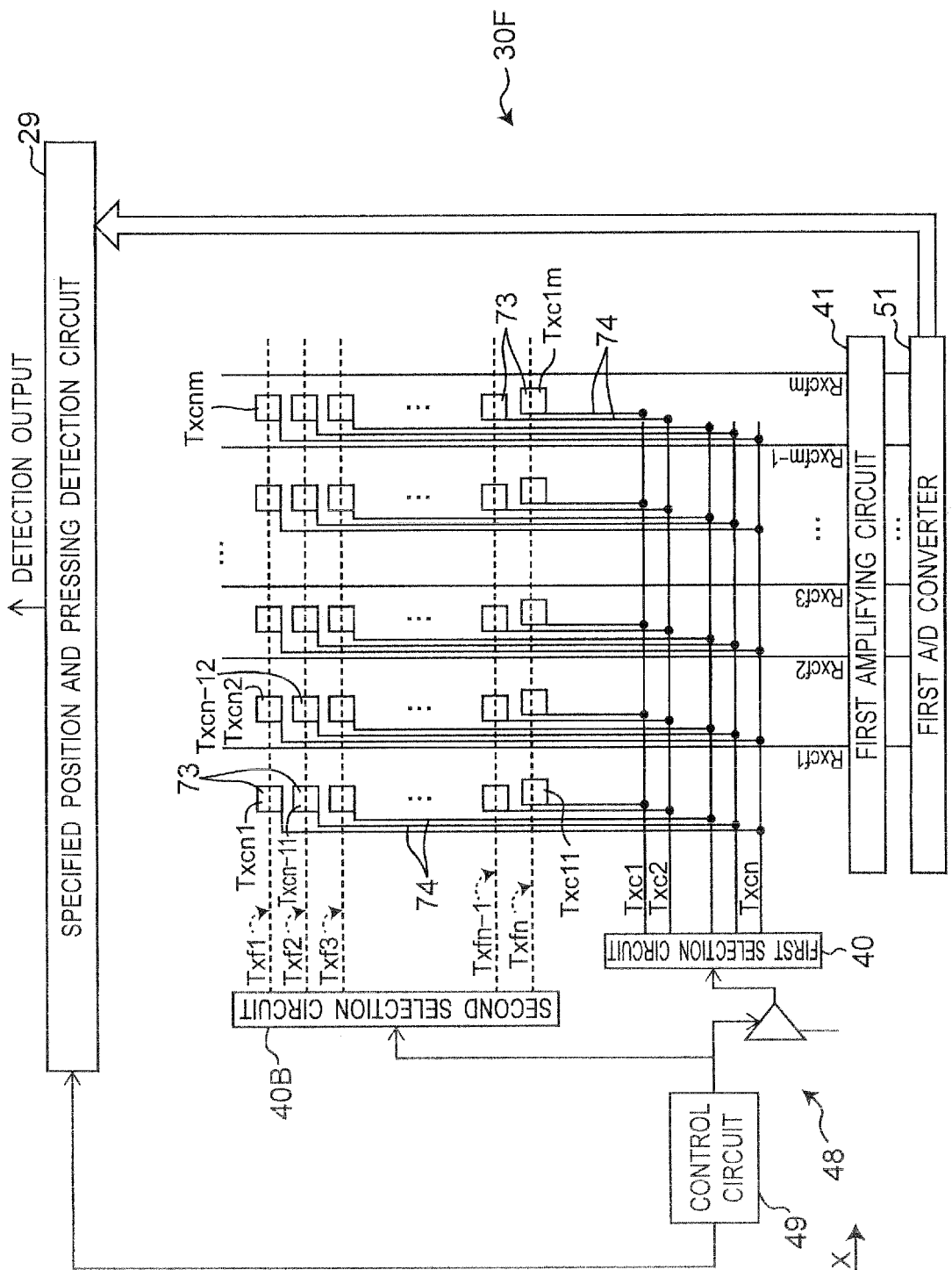
FIG. 10A is a circuit block diagram illustrating a multifunction touch panel according to a variation of the fourth embodiment.

FIG. 10A illustrates a variation of the fourth embodiment. In FIG. 9, the second electrode layer 2B is constituted of numerous (m×n, for example) small square electrode main body portions 71 and wiring portions 72 that connect the electrode main body portions 71 to the first selection circuit 40. However, as a variation of the fourth embodiment, the first electrode layer 1B rather than the second electrode layer 2B may be constituted of numerous (m×n, for example) small square electrode main body portions 73 and wiring portions 74 that connect the electrode each of main body portions 73 to the first selection circuit 40.

In other words, in a multifunction touch panel 30F according to the variation illustrated in FIG. 10A, the third electrode layer 3B is constituted of a plurality of band-shaped third electrodes Txf (Txf1, Txf2, and so on up to Txfn) that extend along the first direction of the second electrode layer 2B (the X axis direction, for example) and are arranged at set intervals from each other in the second direction that intersects with the first direction (the Y axis direction, for example) so as to be electrically insulated from each other. Note that n is the total number of the third electrodes Txf. All of the plurality of third electrodes Txf are connected to the second selection circuit 40B, which is connected to the control circuit 49.

The second electrode layer 2B is constituted of a plurality of band-shaped second electrodes Rxcf (Rxcf1, Rxcf2, and so on up to Rxcfm) that extend along the second direction (the Y axis direction, for example) and are arranged at set intervals from each other in the first direction (the X axis direction, for example) so as to be electrically insulated from each other. Note that m is the total number of the second electrodes Rxcf. All of the plurality of second electrodes Rxcf are connected to the first amplifying circuit 41.

The first electrode layer 1B is constituted of the electrode main body portions 73 (Txc11 to Txcnm) and the wiring portions 74 serving as the first electrodes Txc. The electrode main body portions 73 (Txc11 to Txcnm) are numerous (m×1, for example) small square electrode main body portions 73 arranged in rows at set intervals from each other in at least the first direction (the X axis direction, for example), and, for example, are numerous (m×n, for example) small square electrode main body portions 73 (Txc11 to Txcnm) arranged in a matrix at set intervals from each other in the first direction (the X axis direction, for example) and the second direction (the Y axis direction, for example). The wiring portions 74 connect each of the electrode main body portions 73 to the first selection circuit 40.

In FIG. 10A, the m electrode main body portions 73 (Txc11, Txc12, and so on up to Txc1m) arranged along the first direction (the X axis direction, for example) and the wiring portions 74 connected thereto all correspond to the same electrode (a first electrode Txc1, for example). These electrodes are arranged in the second direction (the Y axis direction, for example) so as to constitute the plurality of first electrodes Txc (Txc1 to Txcn). Note that n is the total number of the first electrodes Txc. All of the plurality of first electrodes Txc are connected to the first selection circuit 40, which is connected to the control circuit 49. The n electrode main body portions 73 arranged along the Y axis direction (for example, Txc11 and Txc21 to Txcn1) are disposed in a position lateral to one of the second electrodes Rxcf (for example, Rxcf1).

Thus, under the control of the control circuit 49, during position detection, a driving signal is inputted into the first selection circuit 40 from the transmission signal driving circuit (signal generating circuit) 48, and driving signals are then sequentially outputted from the first selection circuit 40 to the first electrode Txc1, Txc2, and so on up to Txcn. During this position detection, the first electrodes Txc function as transmission-side position detection electrodes and the second electrodes Rxcf function as reception-side position detection electrodes. The first electrodes Txc and the second electrodes Rxcf constitute a projection-type mutual capacitance touch panel unit 31B to carry out the position detection. In other words, the signals detected by the second electrodes Rxcf are amplified by the first amplifying circuit 41. The signals amplified by the first amplifying circuit 41 are A/D converted by the first A/D converter 51. Then, the digital signals obtained from the A/D conversion are inputted to the specified position and pressing detection circuit 29 to carry out the position detection.

On the other hand, under the control of the control circuit 49, during force detection, a driving signal is inputted into the second selection circuit 40B from the transmission signal driving circuit (signal generating circuit) 48, and driving signals are then sequentially outputted to the third electrode Txf1, Txf2, and so on up to Txfn. During this force detection, the third electrodes Txf function as transmission-side force detection electrodes and the second electrodes Rxcf function as reception-side force detection electrodes. The third electrodes Txf and the second electrodes Rxcf constitute a cross point electrostatic capacitance touch panel unit 32B to detect a force on the basis of a change in the distance between the third electrodes Txf and the second electrodes Rxcf caused by a pressing force from the side of the first electrodes Txc or the second electrodes Rxcf. In other words, the signals detected by the second electrodes Rxcf are amplified by the first amplifying circuit 41. The signals amplified by the first amplifying circuit 41 are A/D converted by the first A/D converter 51. Then, the digital signals obtained from the A/D conversion are inputted to the specified position and pressing detection circuit 29 to carry out the force detection.

Figure 10B:
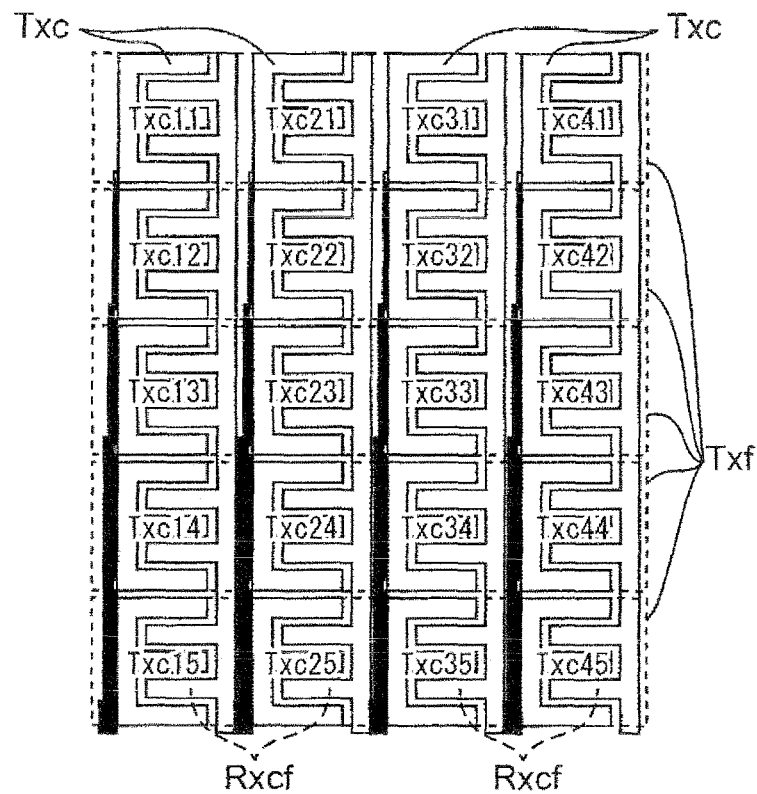
FIG. 10B is a schematic view illustrating an example of a pattern of electrodes in FIG. 10A.
Figure 10C:
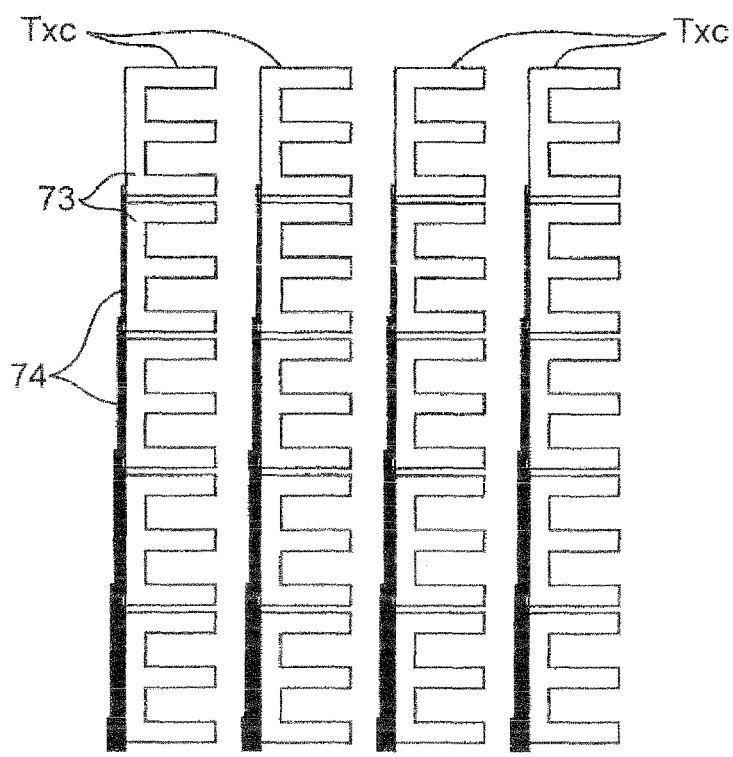
FIG. 10C is a schematic view illustrating an example of a pattern of electrodes Txc in FIG. 10A.
Figure 10D:
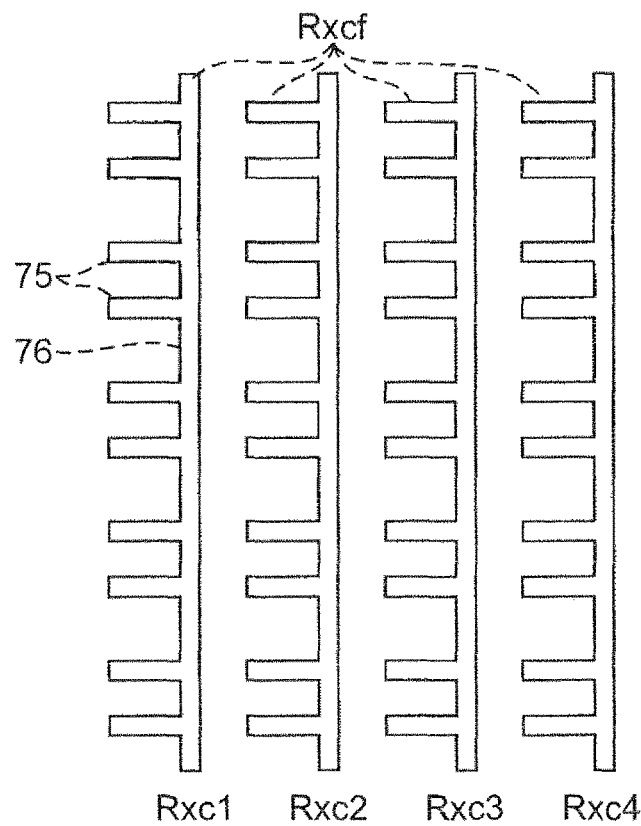
FIG. 10D is a schematic view illustrating an example of a pattern of electrodes Rxcf in FIG. 10A.
Figure 10E:
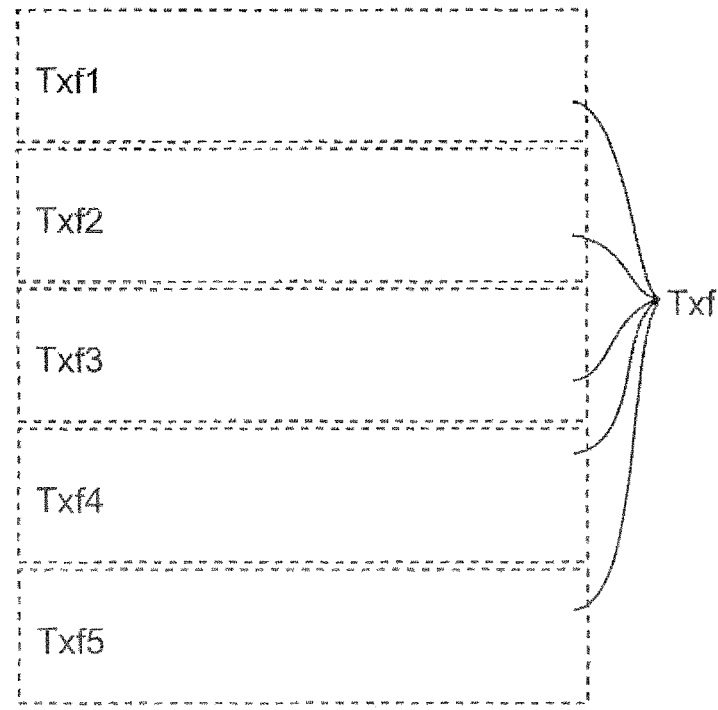
FIG. 10E is a schematic view illustrating an example of a pattern of electrodes Txf in FIG. 10A.

The electrode pattern used in FIG. 10A may be configured as illustrated in FIGS. 10B to 10E. That is, as illustrated in FIGS. 10B and 10C, the first electrodes Txc are constituted of "E"-shaped electrode main body portions 73, and the wiring portions 74 that connect each of the electrode main body portions 73 to the first selection circuit 40. As illustrated in FIGS. 10B and 10C, the second electrodes Rxcf are constituted of branched electrode portions 75, each having two narrow parts that fit into the gaps in the corresponding "E"-shaped electrode main body portions 73 of the first electrodes Txc, and wiring portions 76 that connect the branched electrode portions 75 to the first amplifying circuit 41. As illustrated in FIGS. 10B and 10E, the third electrodes Txf are each constituted of rectangular band-shaped electrode main body portions, and the respective electrode main body portions are connected to the second selection circuit 40B. Forming the electrodes in an "E"-shape in this manner makes it possible to combine transmission side electrodes and reception side electrodes in a comb-tooth shape, which in turn makes it possible to increase the electrostatic capacitance between the transmission side electrodes and the reception side electrodes.

Figure 10F:
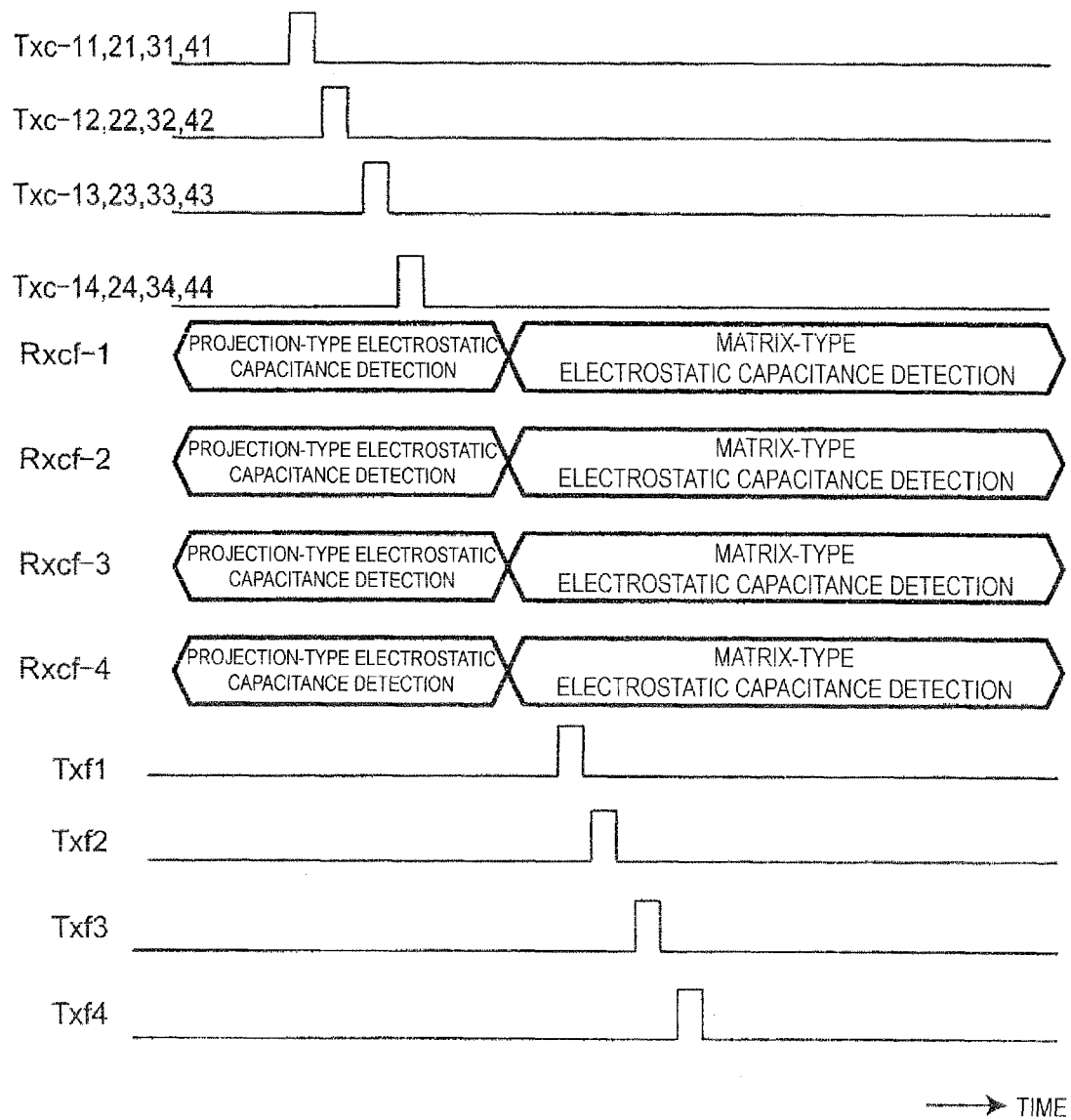
FIG. 10F is a diagram illustrating a timing chart of the multifunction touch panel according to a variation on the fourth embodiment.

FIG. 10F illustrates a timing chart according to the variation of the fourth embodiment. The horizontal axis represents time. During position detection, when driving signals are issued at first electrodes Txc10 to Txc44, changes in the electrostatic capacitances of respective second electrodes Rxcf1 to Rxcf4 are detected carry out the position detection. On the other hand, during force detection, when driving signals are issued at third electrodes Txf1 to Txf4, changes in the electrostatic capacitances of the respective second electrodes Rxcf1 to Rxcf4 are detected to carry out the force detection.

According to this variation of the fourth embodiment, some of the electrodes in the two touch panel units 31B and 32B (that is, the second electrodes Rxcf) have dual functionality, which makes it possible to reduce the number of members used and make the device thinner as a whole.

Fifth Embodiment

Figure 11:
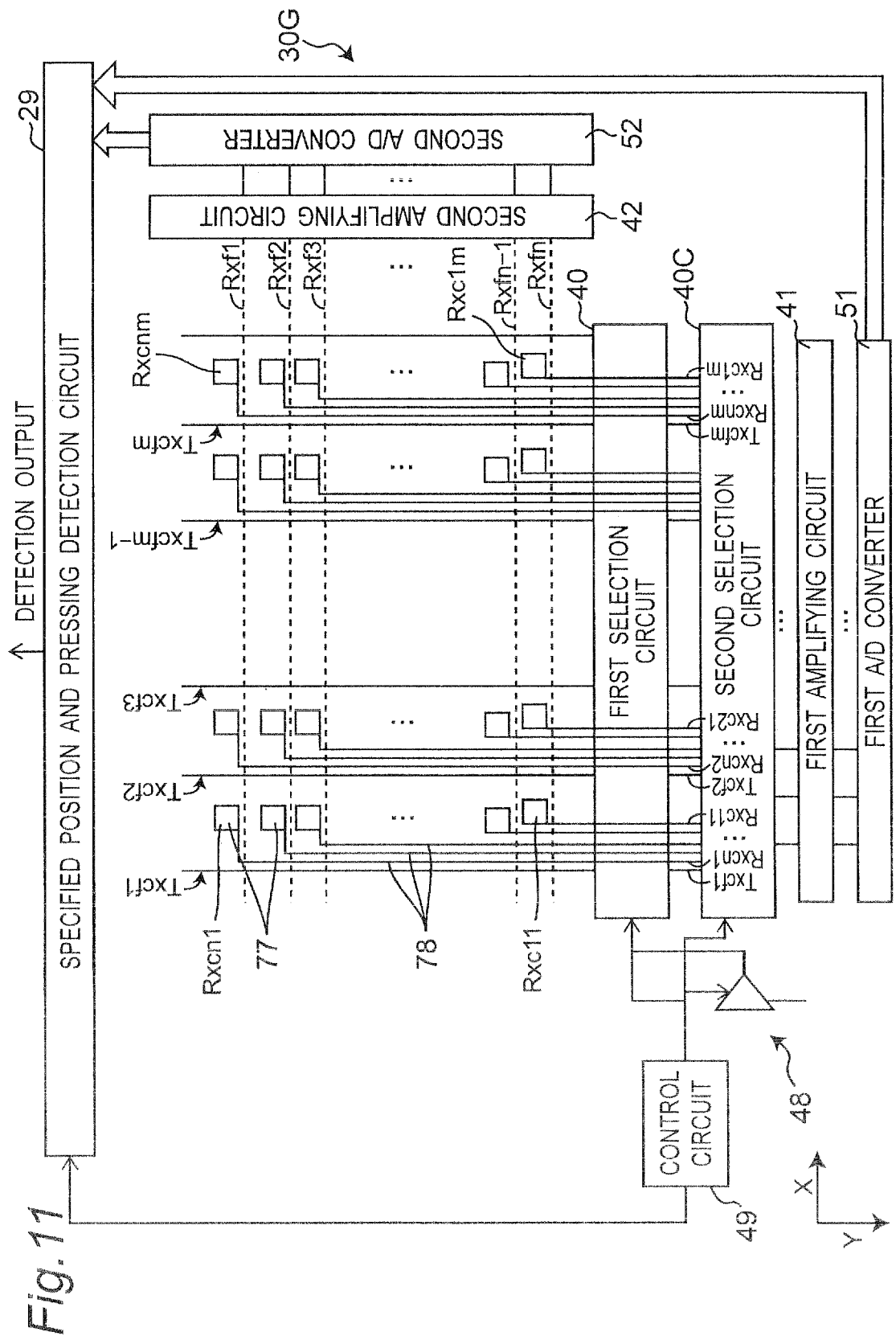
FIG. 11 is a circuit block diagram illustrating a multifunction touch panel according to a fifth embodiment.
Figure 12:
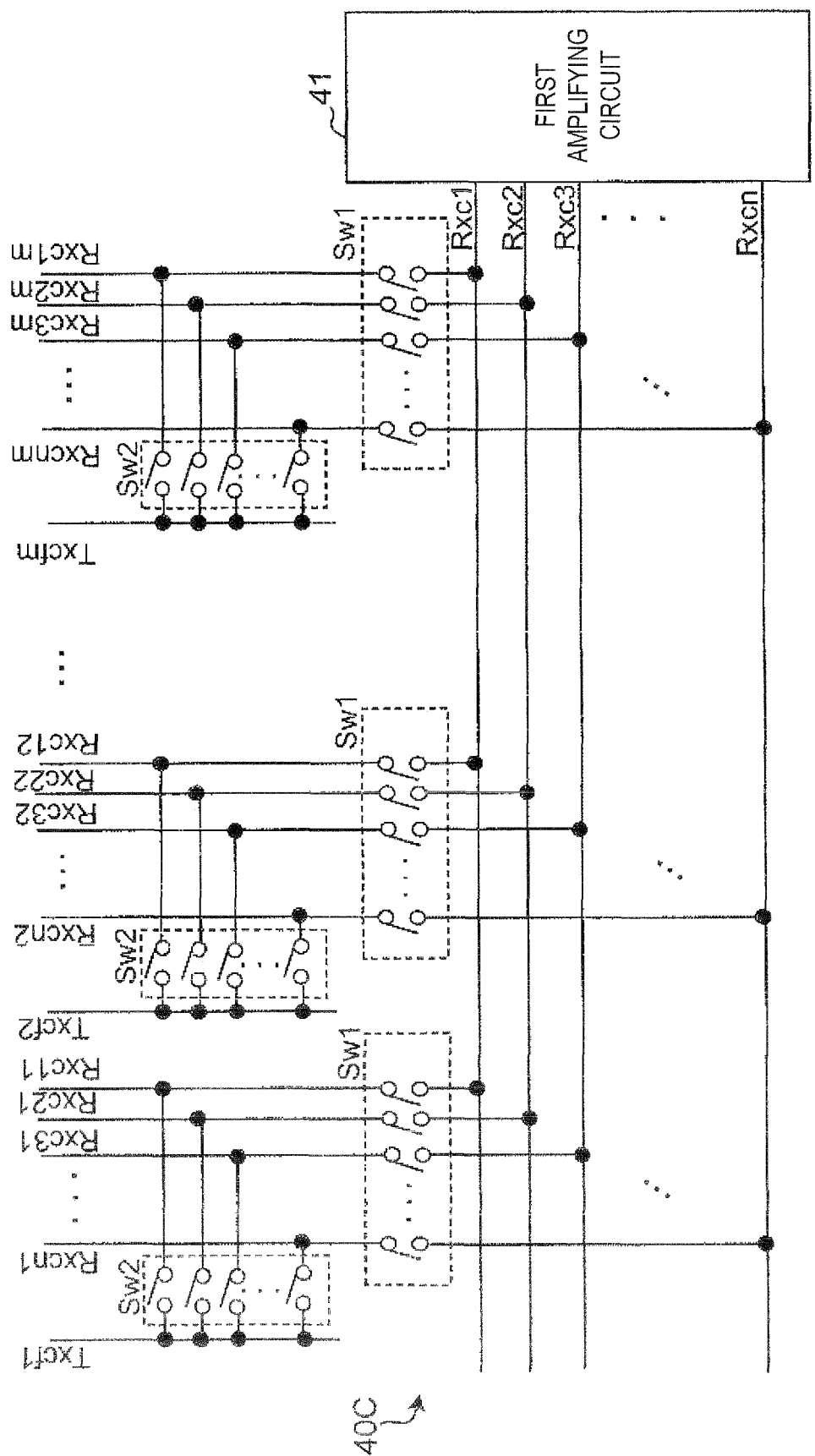
FIG. 12 is a detailed diagram illustrating a second selection circuit in FIG. 11.

FIG. 11 is a circuit block diagram illustrating a multifunction touch panel 30G according to a fifth embodiment of the present invention. FIG. 12 is a detailed diagram illustrating a second selection circuit 40C illustrated in FIG. 11. A cross-sectional view of the multifunction touch panel 30G is the same as FIGS. 3A, 3B, and 3C illustrating the multifunction touch panel 30C according to the second embodiment. The following will primarily describe the differences from the second embodiment.

In the fifth embodiment, an electrode pair constituted of electrodes functioning as a transmission side electrode and a reception side electrode that are electrically insulated from each other during position detection are switched by a switching unit SW such as a switch so as to be connected as the same transmission-side or reception-side electrode during force detection.

Like the multifunction touch panel 30C, the multifunction touch panel 30G has a two-layer structure of electrode layers. In other words, the multifunction touch panel 30G is constituted of the first insulating sheet 11, the first electrode layer 1 and second electrode layer 2, the second dielectric 22, the third electrode layer 3, and the third insulating sheet 13 laminated together.

The third electrode layer 3 is constituted of a plurality of band-shaped third electrodes Rxf (Rxf1, Rxf2, and so on up to Rxfn) that extend along a first direction (the X axis direction, for example) and are arranged at set intervals from each other in a second direction (the Y axis direction, for example) so as to be electrically insulated from each other. Note that n is the total number of the third electrodes Rxf. All of the third electrodes Rxf are connected to the second amplifying circuit 42.

The second electrode layer 2 is constituted of a plurality of band-shaped second electrodes Txcf (Txcf1, Txcf2, and so on up to Txcfm) that extend along the second direction (the Y axis direction, for example) and are arranged at set intervals from each other in the first direction (the X axis direction, for example) so as to be electrically insulated from each other. Note that m is the total number of the second electrodes Txcf. All of the second electrodes Txcf are connected to the first selection circuit 40, and can be connected to the first amplifying circuit 41 or the first electrodes Rxc via the second selection circuit 40C.

The first electrode layer 1 is constituted of electrode main body portions 77 (Rxc11 to Rxcnm) and wiring portions 78 serving as the first electrodes Rxc. The electrode main body portions 77 (Rxc11 to Rxcnm) are numerous (m×1, for example) small square electrode main body portions 77 arranged in rows at set intervals from each other in at least the first direction (the X axis direction, for example), and, for example, are numerous (m×n, for example) small square electrode main body portions 77 (Rxc11 to Rxcnm) arranged in a matrix at set intervals from each other in the first direction (the X axis direction, for example) and the second direction (the Y axis direction, for example). The wiring portions 78 connect each of the electrode main body portions 77 to the second selection circuit 40C.

In FIG. 11, the m electrode main body portions 77 (Rxc11, Rxc12, and so on up to Rxc1$m$) arranged along the first direction (the X axis direction, for example) and the wiring portions 78 connected thereto all correspond to the same electrode (a first electrode Rxc1, for example). All of the first electrodes Rxc can be connected to the first amplifying circuit 41 or the second electrodes Txcf via the second selection circuit 40C.

As illustrated in FIG. 12, the second selection circuit 40C is constituted of two types of switches, namely first switches SW1 and second switches SW2, serving as switching units. Each of the first switches SW1 opens and closes connections between each row of the first electrodes Rxc (Rxc11, Rxc12, and so on up to Rxc1$m$, for example) arranged along the each X axis direction, and the first amplifying circuit 41. Each of the second switches SW2 opens and closes connections between each row of first electrodes Rxc arranged along the each Y axis direction and a single second electrode Txcf provided parallel to that single row of first electrodes Rxc (for example, connections between the first electrodes Rxc11, Rxc21, and so on up to Rxcn1, and the second electrode Txcf1 provided parallel to those first electrodes).

Accordingly, during position detection, the first switches SW1 are closed and the second switches SW2 are opened, and when driving signals are issued from the first selection circuit 40 to the second electrodes Txcf1 to Txcfm, changes in the electrostatic capacitances in the respective rows of the first electrodes Rxc (where one row is Rxc11, Rxc12, and so on up to Rxc1m, for example) arranged along the X axis direction are detected to carry out the position detection. In other words, the signals detected by the first electrodes Rxc are amplified by the first amplifying circuit 41. The signals amplified by the first amplifying circuit 41 are A/D converted by the first A/D converter 51. Then, the digital signals obtained from the A/D conversion are inputted to the specified position and pressing detection circuit 29 to carry out the position detection.

On the other hand, during force detection, the first switches SW1 are opened and the second switches SW2 are closed, such that one row of the first electrodes Rxc arranged along the each Y axis direction and the one second electrode Txcf provided parallel to that one row of first electrodes are handled as a single transmission side electrode. Thus when driving signals are issued from the second selection circuit 40C, changes in the distance from the third electrodes Rxf are detected to carry out the force detection. In other words, the signals detected by the third electrodes Rxf are amplified by the second amplifying circuit 42. The signals amplified by the second amplifying circuit 42 are A/D converted by the second A/D converter 52. Then, the digital signals obtained from the A/D conversion are inputted to the specified position and pressing detection circuit 29 to carry out the force detection.

Accordingly, during position detection, the first switches SW1 are closed and the second switches SW2 are opened so as to disconnect the first electrodes Rxc from the second electrodes Txcf. As a result, under the control of the control circuit 49, a driving signal is inputted into the first selection circuit 40 from the transmission signal driving circuit (signal generating circuit) 48, and driving signals are then sequentially outputted from the first selection circuit 40 to the second electrode Txcf1, Txcf2, and so on up to Txcfm. During position detection, the second electrodes Txcf function as transmission-side position detection electrodes and the first electrodes Rxc function as reception-side position detection electrodes. The second electrodes Txcf and the first electrodes Rxc constitute the projection-type mutual capacitance touch panel unit 31 to carry out the position detection.

On the other hand, during force detection, the first switches SW1 are opened and the second switches SW2 are closed such that the first electrodes Rxc and the second electrodes Txcf are handled as a single transmission side electrode. In other words, the first electrodes Rxc and the second electrodes Txcf function as transmission-side force detection electrodes and the third electrodes Rxf function as reception-side force detection electrodes. The first electrodes Rxc and second electrodes Txcf. and the third electrodes Rxf, constitute the cross point electrostatic capacitance touch panel unit 32 to detect a force on the basis of a change in the distance between the first electrodes Rxc and second electrodes Txcf, and the third electrodes Rxf, caused by a pressing force from the side of the first electrodes Rxc or the second electrodes Txcf.

Figure 13A:
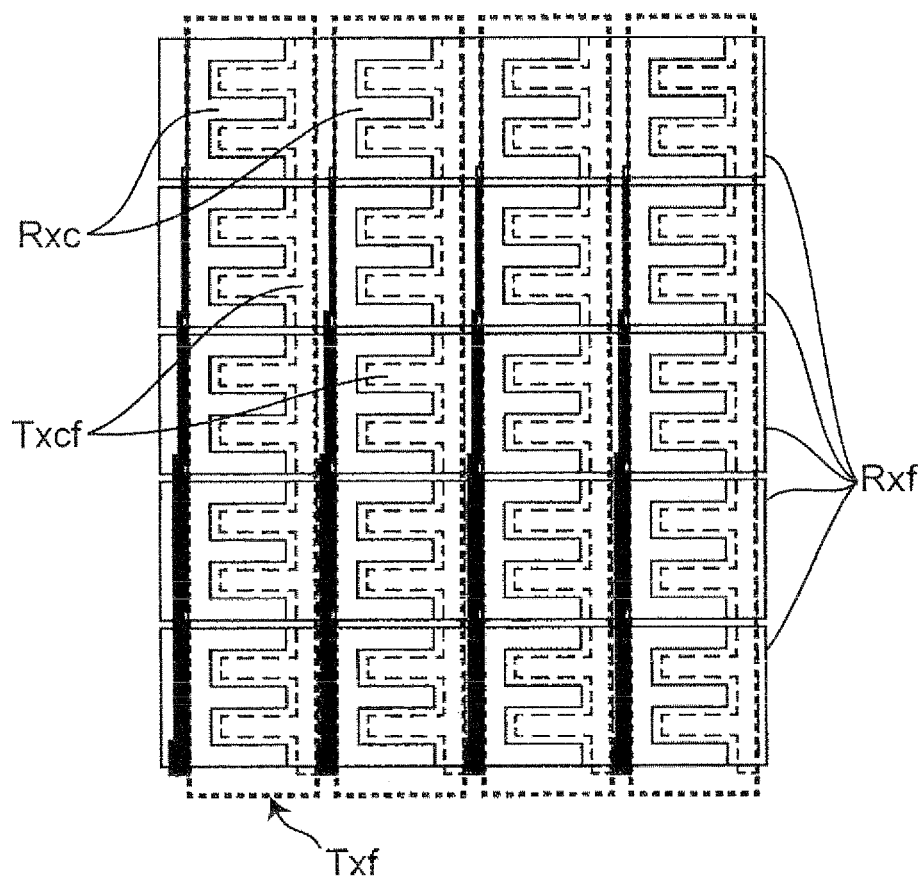
FIG. 13A is a schematic view illustrating an example of a pattern of electrodes in the multifunction touch panel in FIG. 11.

The electrode pattern used in FIG. 11 may be configured as illustrated in FIG. 13A. The shapes are similar to those illustrated in FIGS. 10B to 10E, but the electrodes are different. In other words, the first electrodes Txc in FIGS. 10B to 10E are the first electrodes Rxc in FIG. 13A. The third electrodes Txf in FIGS. 10B to 10E are the third electrodes Rxf in FIG. 13A. The second electrodes Rxcf in FIGS. 10B to 10E are the second electrodes Txcf in FIG. 13A. The first electrodes Rxc and the second electrodes Txcf in FIG. 13A function as a transmission side electrode Tx(f) during force detection.

Figure 13B:
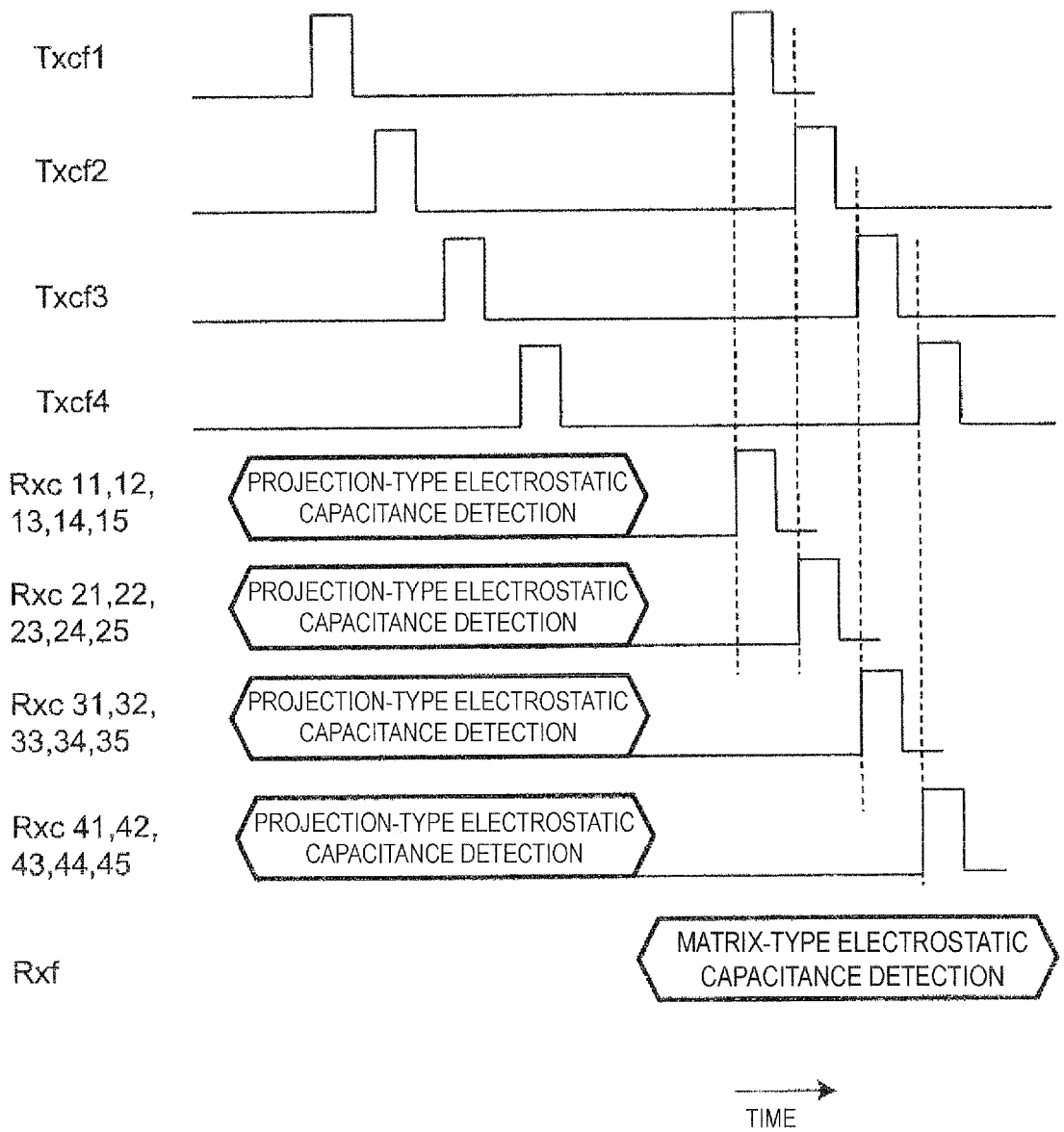
FIG. 13B is a diagram illustrating a timing chart of the multifunction touch panel in FIG. 1I.

FIG. 13B illustrates a timing chart according to the fifth embodiment. The horizontal axis represents time. During position detection, when driving signals are issued at first electrodes Txcf1 to Txcf4, changes in the electrostatic capacitances of respective second electrodes Rxc11 to Rxc15, Rxc21 to Rxc25, Rxc31 to Rxc35, and Rxc41 to Rxc45 are detected to carry out the position detection. On the other hand, during force detection, when driving signals are issued at first electrodes Txcf1 to Txcf4, changes in the electrostatic capacitances of the respective third electrodes Rxf1 to Rxf4 are detected to carry out the force detection.

According to this fifth embodiment, some of the electrodes in the two touch panel units 31 and 32 (that is, the first electrodes Rxc and the second electrodes Txcf) have dual functionality for position detection and force detection, which makes it possible to reduce the number of members used and make the device thinner as a whole. Furthermore, during force detection, the first electrodes Rxc and the second electrodes Txcf can be handled as a single transmission side electrode Tx(f), and thus the surface area of the transmission side electrode can be increased. Additionally, because the transmission side electrode Tx(f) is located closer to the finger or the like than the reception side electrodes, noise from the finger or the like can be shielded by the transmission side electrode Tx(f), which makes it possible to improve the SN ratio in the electrostatic capacitance detection of the matrix.

Sixth Embodiment

Figure 14:
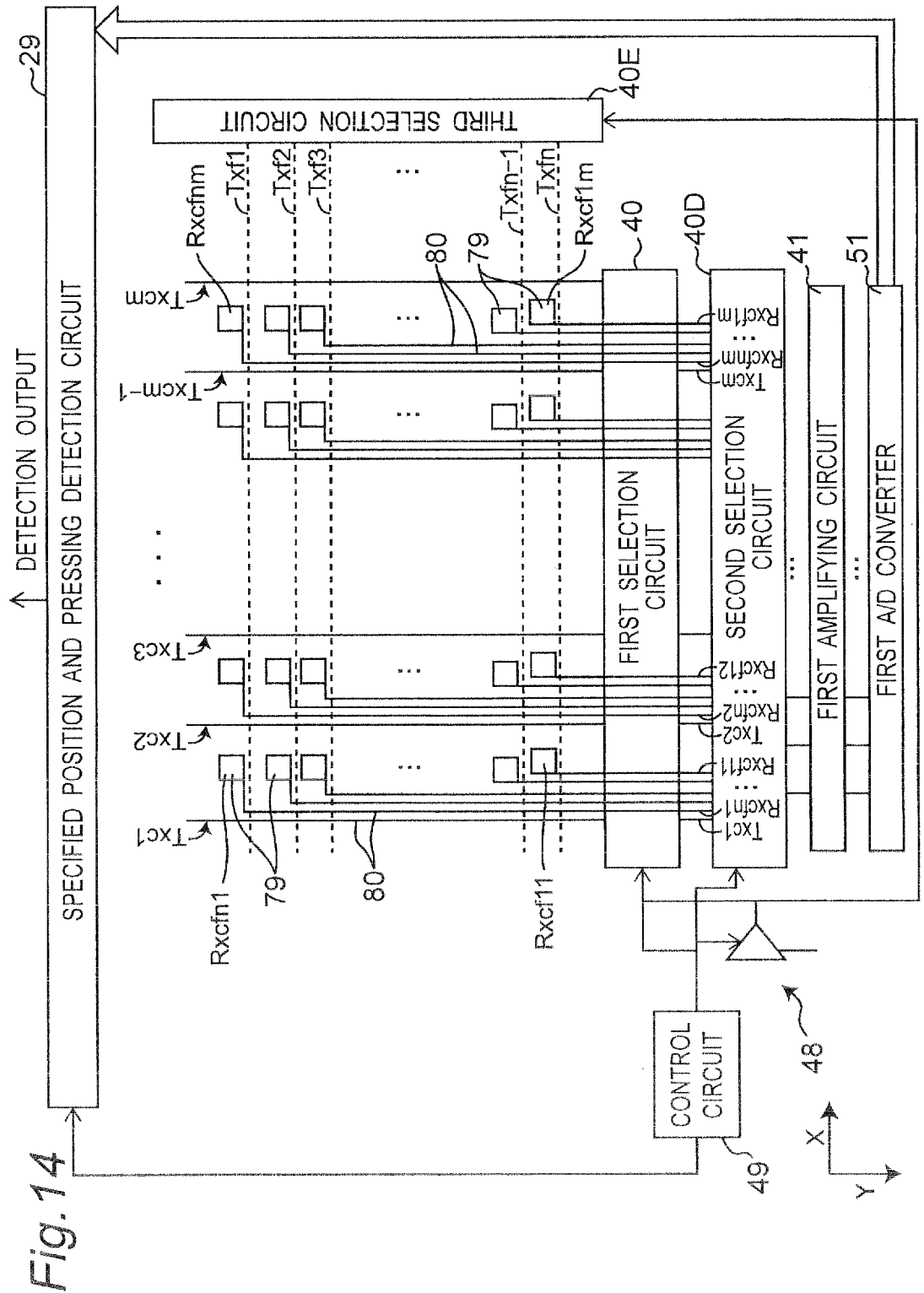
FIG. 14 is a circuit block diagram illustrating a multifunction touch panel according to a sixth embodiment.
Figure 15:
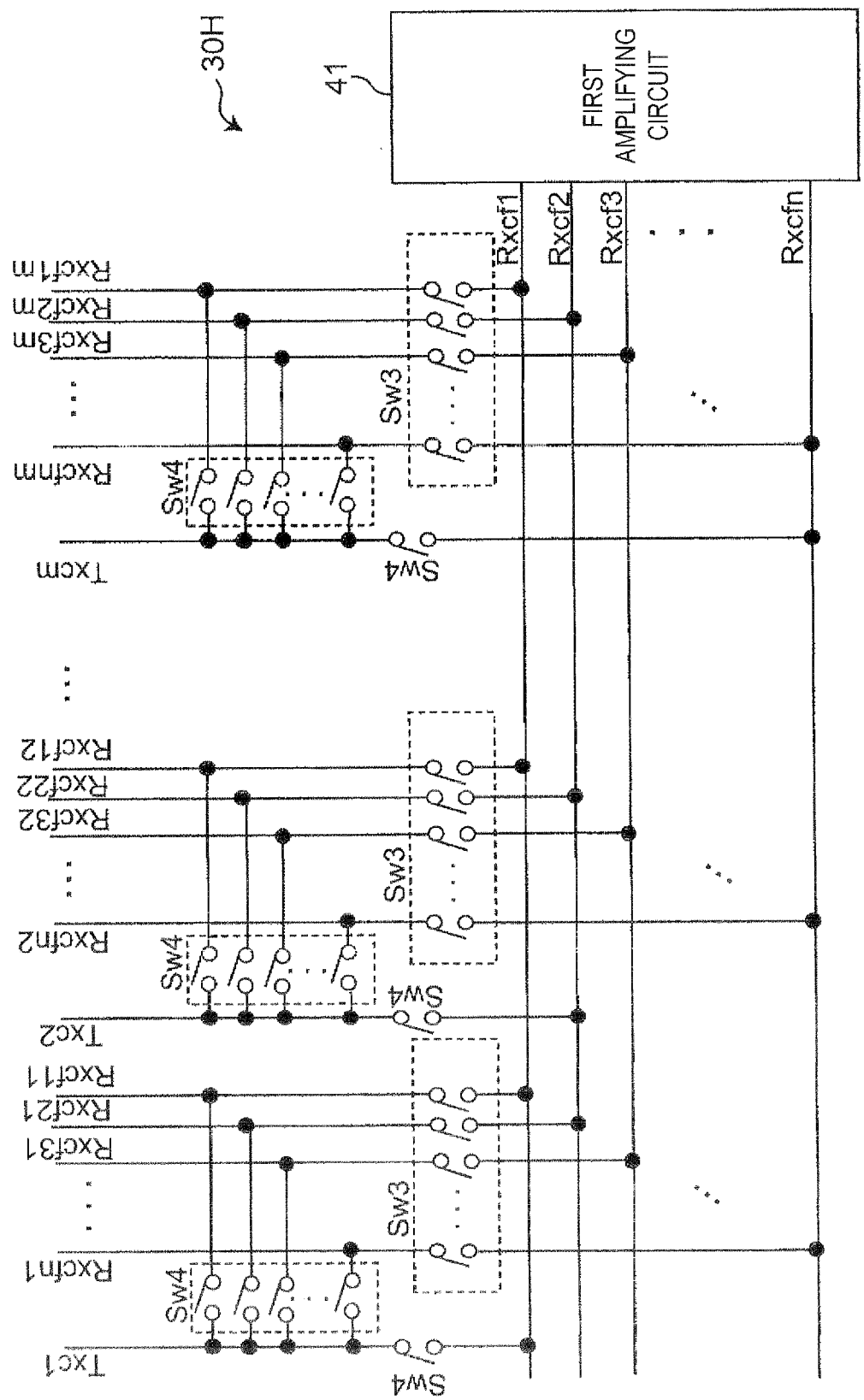
FIG. 15 is a detailed diagram illustrating a second selection circuit in FIG. 14.

FIG. 14 is a circuit block diagram illustrating a multifunction touch panel 30H according to a sixth embodiment of the present invention. FIG. 15 is a diagram illustrating in detail a second selection circuit 40D in FIG. 14. A cross-sectional view of the multifunction touch panel 30H is the same as FIGS. 3A, 3B, and 3C illustrating the multifunction touch panel 30C according to the second embodiment. The following will primarily describe the differences from the second embodiment.

In the sixth embodiment, an electrode pair constituted of electrodes functioning as a transmission side electrode and a reception side electrode that are electrically insulated from each other during position detection are switched by a switching unit SW such as a switch so as to be connected as the same transmission-side or reception-side electrode during force detection.

Similar the multifunction touch panel 30C, the multifunction touch panel 30H has a two-layer structure of electrode layers. In other words, the multifunction touch panel 30H is constituted of the first insulating sheet 11, the first electrode layer 1 and second electrode layer 2, the second dielectric 22, the third electrode layer 3, and the third insulating sheet 13 laminated together.

The third electrode layer 3 is constituted of a plurality of band-shaped third electrodes Txf (Txf1, Txf2, and so on up to Txfn) that extend along the first direction (the X axis direction, for example) and are arranged at set intervals from each other in the second direction (the Y axis direction, for example) so as to be electrically insulated from each other.

Note that n is the total number of the third electrodes Txf. All of the third electrodes Txf are connected to a third selection circuit 40E.

The first electrode layer 1 is constituted of a plurality of band-shaped first electrodes Txc (Txc1, Txc2, and so on up to Txcn) that extend along the second direction (the Y axis direction, for example) and are arranged at set intervals from each other in the first direction (the X axis direction, for example) so as to be electrically insulated from each other. Note that n is the total number of the first electrodes Txc. All of the first electrodes Txc are connected to the first selection circuit 40, and can be connected to the first amplifying circuit 41 or the second electrodes Rxcf via the second selection circuit 40D.

The second electrode layer 2 is constituted of electrode main body portions 79 (Rxcf11 to Rxcfnm) and wiring portions 80 serving as second electrodes Rxcf. The electrode main body portions 79 (Rxcf11 to Rxcfnm) are numerous (m×1, for example) small square electrode main body portions 79 arranged in rows at set intervals from each other in at least the first direction (the X axis direction, for example), and, for example, are numerous (m×n, for example) small square electrode main body portions 79 (Rxcf11 to Rxcfnm) arranged in a matrix at set intervals from each other in the first direction (the X axis direction, for example) and the second direction (the Y axis direction, for example). The wiring portions 80 can connect each of the electrode main body portions 79 to the second selection circuit 40D.

In FIG. 14, the m electrode main body portions 79 (Rxcf11, Rxcf12, and so on up to Rxcf1$m$) arranged along the first direction (the X axis direction, for example) and the wiring portions 80 connected thereto all correspond to the same electrode (a second electrode Rxcf1, for example). All of the first electrodes Rxcf can be connected to the first amplifying circuit 41 or the first electrodes Txc via the second selection circuit 40D.

As illustrated in FIG. 15, the second selection circuit 40D is constituted of two types of switches, namely third switches SW3 and fourth switches SW4, serving as switching units.

Each of the third switches SW3 opens and closes connections between each row of the second electrodes (the second electrodes Rxcf11, Rxcf12, and so on up to Rxcf1$m$, for example) arranged along the each X axis direction, and the first amplifying circuit 41, as well as connections between the first electrodes Txc and first electrode-side contact points of the fourth switches SW4. The third switches SW3 open and close the connections between the first electrodes Txc and the first electrode-side contact points of the fourth switches SW4 for the following reason. That is, if the first electrodes Txc are not disconnected from the first electrode-side contact points of the fourth switches SW4 by the third switches SW3 during force detection, the first electrodes Txc will remain selected by the transmission signal driving circuit 48 and will be unable to receive reception signals.

Each of the fourth switches SW4 opens and closes each connection between each row of second electrodes arranged along the Y axis direction and a single first electrode provided parallel to that single row of second electrodes (for example, each connection between the second electrodes Rxcf11. Rxcf21, and so on up to Rxcfn1, and the first electrode Txc1 provided parallel to those second electrodes), as well as each connection between each of these connection points (between the respective second electrodes and the respective first electrodes) and the first amplifying circuit 41.

Accordingly, during position detection, the third switches SW3 are closed and the fourth switches SW4 are opened, and when driving signals are issued from the first selection circuit 40 to the first electrodes Txc1 to Txcm, changes in the electrostatic capacitances in the respective rows of the second electrodes (where one row is the second electrodes Rxcf11, Rxcf12, and so on up to Rxcf1$m$, for example) arranged along the X axis direction are detected to carry out the position detection. In other words, the signals detected by the second electrodes Rxcf are amplified by the first amplifying circuit 41. The signals amplified by the first amplifying circuit 41 are A/D converted by the first A/D converter 51. Then, the digital signals obtained from the A/D conversion are inputted to the specified position and pressing detection circuit 29 to carry out the position detection.

On the other hand, during force detection, the first electrodes Txc are disconnected from the driving circuit 48 at the first selection circuit 40, the third switches SW3 of the second selection circuit 40D are opened, and the fourth switches SW4 are closed. Thus when driving signals are issued to the third electrodes Txf1 to Txfn from the third selection circuit 40E, one row of the second electrodes Rxcf arranged along the each Y axis direction and the one first electrode Txc provided parallel to that one row of the second electrodes Rxcf are handled as a single reception side electrode. In other words, the signals detected by the second electrodes Rxcf or the first electrodes Txc are amplified by the first amplifying circuit 41. The signals amplified by the first amplifying circuit 41 are A/D converted by the first A/D converter 51. Then, the digital signals obtained from the A/D conversion are inputted to the specified position and pressing detection circuit 29 to carry out the force detection.

Accordingly, during position detection, the third switches SW3 are closed and the fourth switches SW4 are opened so as to disconnect the first electrodes Txc from the second electrodes Rxcf. As a result, under the control of the control circuit 49, a driving signal is inputted into the first selection circuit 40 from the transmission signal driving circuit (signal generating circuit) 48, and driving signals are then sequentially outputted to the first electrode Txc1, Txc2, and so on up to Txcm. During position detection, the first electrodes Txc function as transmission-side position detection electrodes and the second electrodes Rxcf function as reception-side position detection electrodes. The first electrodes Txc and the second electrodes Rxcf constitute a projection-type mutual capacitance touch panel unit 31 to carry out the position detection.

On the other hand, during force detection, the third switches SW3 are opened and the fourth switches SW4 are closed so as to connect the first electrodes Txc to the second electrodes Rxcf. As a result, under the control of the control circuit 49, a driving signal is inputted into the third selection circuit 40E from the transmission signal driving circuit (signal generating circuit) 48, and driving signals are then sequentially outputted to the first electrode Txf1, Txf2, and so on up to Txfn. During force detection, the first electrodes Txc and the second electrodes Rxcf are handled as a single reception side electrode. In other words, the first electrodes Txc and the second electrodes Rxcf function as reception-side force detection electrodes and the third electrodes Txf function as transmission-side force detection electrodes. The first electrodes Txc and second electrodes Rxcf, and the third electrodes Txf, constitute the cross point electrostatic capacitance touch panel unit 32 to detect a force on the basis of a change in the distance between the first electrodes Txc and second electrodes Rxcf, and the third electrodes Txf, caused by a pressing force from the side of the first electrodes Txc or the second electrodes Rxcf.

Figure 16A:
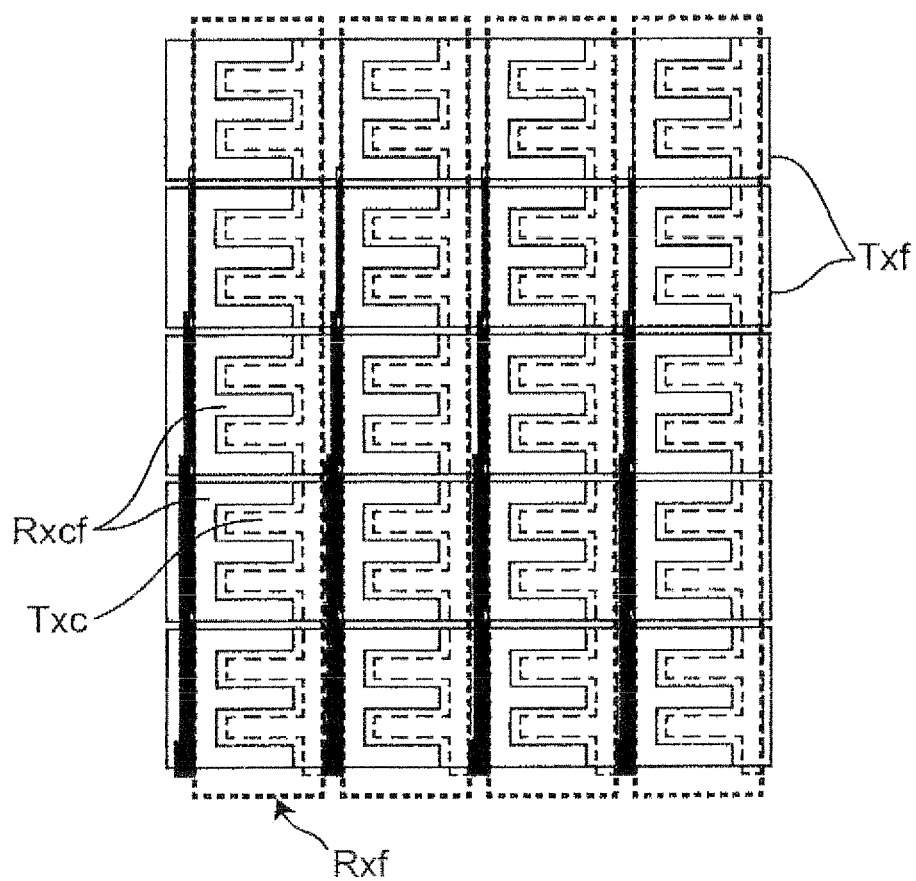
FIG. 16A is a schematic view illustrating an example of a pattern of electrodes in the multifunction touch panel in FIG. 14.

The electrode pattern used in FIG. 14 may be configured as illustrated in FIG. 16A. The shapes are the same as those illustrated in FIGS. 10B to 10E, but the first electrodes Txc and the second electrodes Rxcf function as a reception-side force detection electrode Rx(f).

Figure 16B:
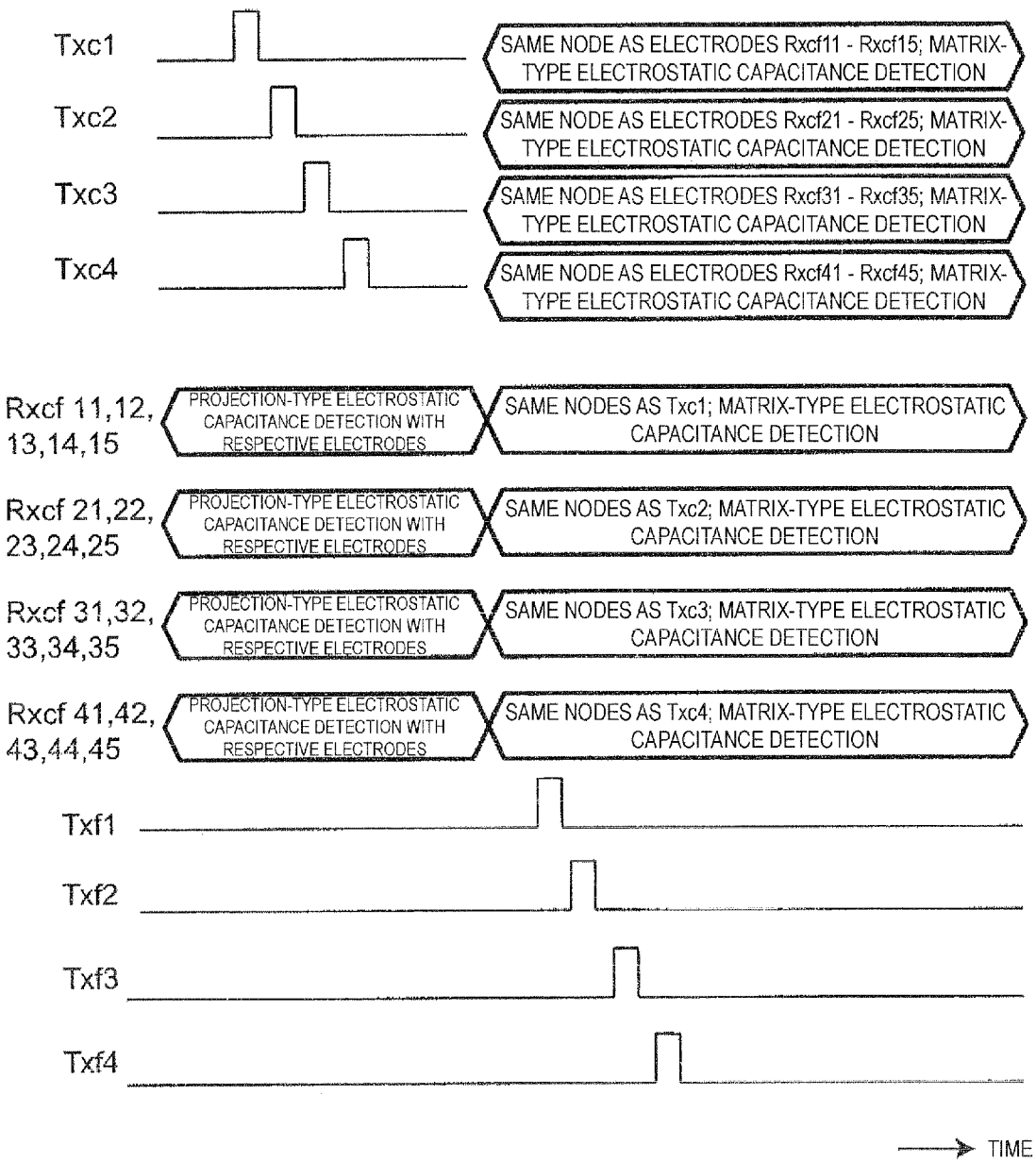
FIG. 16B is a diagram illustrating a timing chart of the multifunction touch panel in FIG. 14.

FIG. 16B illustrates a timing chart according to the sixth embodiment. The horizontal axis represents time. During position detection, when driving signals are issued at first electrodes Txc1 to Txc4, changes in the electrostatic capacitances of respective second electrodes Rxcf11 to Rxcf15, Rxcf21 to Rxcf25, Rxcf31 to Rxcf35, and Rxcf41 to Rxcf45 are detected to carry out the position detection. On the other hand, during force detection, when driving signals are issued at third electrodes Txf1 to Txf4, changes in the electrostatic capacitances of the respective second electrodes Rxcf11 to Rxcf15, Rxcf21 to Rxc125, Rxc131 to Rxcf35, and Rxcf41/ to Rxcf45 are detected to carry out the force detection.

According to this sixth embodiment, some of the electrodes in the two touch panel units 31 and 32 (that is, the first electrodes Txc and the second electrodes Rxcf) have dual functionality for position detection and force detection, which makes it possible to reduce the number of members used and make the device thinner as a whole. Furthermore, during force detection, the first electrodes Txc and the second electrodes Rxcf can be handled as a single reception side electrode Rx(f), and thus the surface area of the reception side electrode can be increased. Additionally, the transmission side electrode Tx(f) serves as a shield during projection-type sensing, and thus the transmission side electrode Tx(f) can shield noise from below the multifunction touch panel such as a liquid-crystal panel. This makes it possible to improve the SN ratio in the electrostatic capacitance detection of the matrix.

Note that the number of third electrodes Rxf or Txf in each of the embodiments or the variations thereon is indicated by n, in the same manner as with the other electrodes, in order to facilitate understanding. However, the number is not limited thereto. In other words, for example, the number of the third electrodes Rxf and Txf may be p, where p n.

Note that by appropriately combining any of the embodiments or variations of the various embodiments or variations described above, the beneficial effects of each of the embodiments and variations can be provided. Additionally, combinations of the embodiments, or combinations of the examples, or combinations of the embodiments and the examples are possible. Furthermore, combinations of the features of different embodiments or examples are possible.

INDUSTRIAL APPLICABILITY

In the multifunction touch panel according to the present invention, a single electrode can have dual functionality between a position detection touch panel unit and a force detection touch panel unit, and thus the device can be made thinner even when both of the touch panel units are laminated together. As such, the touch panel can be applied in a variety of mobile electronic devices such as personal computers, tablets, smartphones, and smartwatches.

REFERENCE SIGNS LIST 1, 1B First electrode layer
2, 2B Second electrode layer
3, 3B Third electrode layer
11 First insulating sheet
12 Second insulating sheet
13 Third insulating sheet
21 First dielectric
22 Second dielectric
24 Air layer
29 Specified position and pressing detection circuit
30, 30B, 30C, 30D, 30E, 30F, 30G, 30H Multifunction touch panel
31 Projection-type mutual capacitance touch panel unit
32 Cross point electrostatic capacitance touch panel unit
35 First insulating layer
36 Second insulating layer
40 First selection circuit
40B, 40C, 40D Second selection circuit
40E Third selection circuit
41 First amplifying circuit
42 Second amplifying circuit
48 Transmission signal driving circuit (signal generating circuit)
49 Control circuit (controller)
51 First A/D converter
52 Second A/D converter
63, 75 Branched electrode portion
60, 65, 67, 69, 71, 73, 77, 79 Electrode main body portion
61, 64, 66, 68, 70, 72, 74, 76, 78, 80 Wiring portion
Rxc First electrode (reception-side position detection electrode)
Rxcf Second electrode (reception-side position detection electrode, reception-side force detection electrode)
Txc Transmission-side position detection electrode Tx(Cap)
Txcf Second electrode (transmission-side position detection electrode, transmission-side force detection electrode)
Rxf Third electrode (reception-side force detection electrode)
Txf Transmission side force detection electrode Tx(f)

The invention claimed is:

1. A multifunction touch panel comprising:
a first electrode layer and a second electrode layer both of which are disposed in one plane so as to be electrically insulated from each other, and a third electrode layer electrically insulated from the first electrode layer and the second electrode layer, the third electrode layer being laminated on the first electrode layer and the second electrode layer; and
a dielectric, that is disposed between the first and second electrodes layers and the third electrode layer and that is able to be elastically deformed by a pressing force from a first electrode layer side or a second electrode layer side to reduce a distance between the first electrode layer or the second electrode layer and the third electrode layer,
wherein one of band-shaped electrodes arranged side by side along a second direction that intersects with a first direction at set intervals from each other and row electrodes constituted of rows of a plurality of electrode main body portions arranged side by side along the first direction at set intervals from each other, constitutes first electrodes of the first electrode layer, and an other of the band-shaped electrodes and the row electrodes constitutes second electrodes of the second electrode layer:
a plurality of band-shaped electrodes arranged side by side along a same direction as the first electrodes of the first electrode layer or a same direction as the second electrodes of the second electrode layer at set intervals from each other, constitute third electrodes of the third electrode layer;

the panel further comprises a switching unit that switches the first electrodes and the second electrodes between an insulated state of being electrically insulated from each other and a connected state of being electrically connected to each other;

during position detection, the switching unit sets the insulated state such that the second electrodes or the first electrodes function as transmission-side position detection electrodes and the first electrodes or the second electrodes function as reception-side position detection electrodes, and the second electrodes and the first electrodes constitute a projection-type mutual capacitance touch panel unit and carry out position detection; and during force detection, the switching unit sets the connected state such that one of the first and second electrodes and the third electrodes functions as transmission-side force detection electrodes and an other of the first and second electrodes and the third electrodes functions as reception-side force detection electrodes, and the first electrodes, the second electrodes, and the third electrodes constitute a cross-point electrostatic capacitance touch panel unit and carry out force detection on basis of a change in the distance between the first electrode layer or the second electrode layer and the third electrodes layer caused by the pressing force from the first electrode layer side or the second electrode layer side.

2. The multifunction touch panel according to claim 1, wherein electrodes constituted of rows of the plurality of electrode main body portions arranged side by side along the first direction at set intervals from each other, constitute the first electrodes;

the band-shaped electrodes arranged side by side along the second direction that intersects with the first direction at set intervals from each other, constitute the second electrodes;

during the position detection, the switching unit sets the insulated state, the second electrodes function as transmission-side position detection electrodes, the first electrodes function as reception-side position detection electrodes, and the second electrodes and the first electrodes constitute the projection-type mutual capacitance touch panel unit; and during the force detection, the switching unit sets the connected state, the first electrodes and the second electrodes function as transmission-side force detection electrodes, the third electrodes function as reception-side force detection electrodes, and the first electrodes, the second electrodes, and the third electrodes constitute the cross-point electrostatic capacitance touch panel unit.

3. The multifunction touch panel according to claim 1, wherein electrodes constituted of rows of the plurality of electrode main body portions arranged side by side along the first direction at set intervals from each other, constitute the second electrodes;

the band-shaped electrodes arranged side by side along the second direction that intersects with the first direction at set intervals from each other, constitute the first electrodes;

during the position detection, the switching unit sets the insulated state, the first electrodes function as transmission-side position detection electrodes, the second electrodes function as reception-side position detection electrodes, and the second electrodes and the first electrodes constitute the projection-type mutual capacitance touch panel unit; and during the force detection, the switching unit sets the connected state, the first electrodes and the second electrodes function as reception-side force detection electrodes, the third electrodes function as transmission-side force detection electrodes, and the first electrodes, the second electrodes, and the third electrodes constitute the cross-point electrostatic capacitance touch panel unit.

* * * * *